US011821882B2

(12) United States Patent
Anderson et al.

(10) Patent No.: US 11,821,882 B2
(45) Date of Patent: Nov. 21, 2023

(54) CONTINUOUS FLOW MIXER

(71) Applicant: Waters Technologies Corporation, Milford, MA (US)

(72) Inventors: Sean Eric Anderson, Dedham, MA (US); Peter MacKinnon, Providence, RI (US)

(73) Assignee: WATERS TECHNOLOGIES CORPORATION, Milford, MA (US)

(*) Notice: Subject to any disclaimer, the term of this patent is extended or adjusted under 35 U.S.C. 154(b) by 0 days.

(21) Appl. No.: 17/481,998

(22) Filed: Sep. 22, 2021

(65) Prior Publication Data
US 2022/0091074 A1 Mar. 24, 2022

Related U.S. Application Data

(60) Provisional application No. 63/081,513, filed on Sep. 22, 2020.

(51) Int. Cl.
*G01N 30/34* (2006.01)
*G01N 30/32* (2006.01)

(52) U.S. Cl.
CPC .......... *G01N 30/34* (2013.01); *G01N 30/32* (2013.01); *G01N 2030/326* (2013.01); *G01N 2030/347* (2013.01)

(58) Field of Classification Search
CPC . B01F 25/432; B01F 33/30; G01N 2030/326; G01N 2030/347; G01N 30/32; G01N 30/34
See application file for complete search history.

(56) References Cited

U.S. PATENT DOCUMENTS

| 3,595,531 A | 7/1971 | Williams et al. |
| 3,830,369 A | 8/1974 | Pfadenhauer |

(Continued)

FOREIGN PATENT DOCUMENTS

| CN | 203061073 U | 7/2013 |
| CN | 203385703 U | 1/2014 |

(Continued)

OTHER PUBLICATIONS

International Search Report and Written Opinion in PCT/US2021/051533 dated Jan. 7, 2022.

(Continued)

*Primary Examiner* — Harshad R Patel
*Assistant Examiner* — Gedeon M Kidanu
(74) *Attorney, Agent, or Firm* — Schmeiser, Olsen & Watts LLP; Victor J. Baranowski

(57) ABSTRACT

A continuous flow mixer for use in a chromatography system includes a first channel structure located between a mixer inlet and a mixer outlet. The first channel structure includes a first inlet branch, a second inlet branch, a plurality of outlet branches including at least a first outlet branch and a second outlet branch, a first plurality of branches splitting from the first inlet branch, each branch of the first plurality of branches connected to a different of the plurality of outlet branches, and a second plurality of branches splitting from the second inlet branch, each branch of the second plurality of branches connected to a different of the plurality of outlet branches. At least two branches of the first and second plurality of branches that are connected to the first outlet branch are offset in fluid residence time through the at least two branches.

18 Claims, 14 Drawing Sheets

(56) References Cited

U.S. PATENT DOCUMENTS

| | | | |
|---|---|---|---|
| 3,985,019 A | 10/1976 | Boehme et al. |
| 4,311,586 A | 1/1982 | Baldwin et al. |
| 4,437,812 A | 3/1984 | Abu-Shumays et al. |
| 4,496,245 A | 1/1985 | Conrad et al. |
| 4,506,987 A | 3/1985 | Daughton et al. |
| 4,534,659 A | 8/1985 | Dourdeville et al. |
| 4,767,279 A | 8/1988 | Dourdeville et al. |
| 4,842,730 A | 6/1989 | James et al. |
| 4,882,062 A | 11/1989 | Moeller et al. |
| 4,882,063 A | 11/1989 | Allington et al. |
| 4,954,253 A | 9/1990 | Alexandrov et al. |
| 5,275,723 A | 1/1994 | Greenley et al. |
| 5,423,661 A | 6/1995 | Gabeler et al. |
| 5,656,034 A | 8/1997 | Kochersperger et al. |
| 5,664,938 A | 9/1997 | Yang |
| 5,738,783 A | 4/1998 | Shirota et al. |
| 5,846,411 A | 12/1998 | Harter et al. |
| 5,887,977 A | 3/1999 | Morikawa |
| 5,904,424 A | 5/1999 | Schwesinger et al. |
| 5,918,976 A | 7/1999 | Hashimoto et al. |
| 6,048,496 A | 4/2000 | Zhou et al. |
| 6,170,981 B1 | 1/2001 | Regnier et al. |
| 6,190,034 B1 | 2/2001 | Nielsen et al. |
| 6,319,469 B1 | 11/2001 | Mian et al. |
| 6,629,775 B2 | 10/2003 | Choikhet et al. |
| 6,705,357 B2 | 3/2004 | Jeon et al. |
| 6,845,787 B2 | 1/2005 | Karp et al. |
| 6,851,846 B2 | 2/2005 | Fujii et al. |
| 6,883,559 B2 | 4/2005 | Jeon et al. |
| 6,887,384 B1 | 5/2005 | Frechet et al. |
| 6,890,093 B2 | 5/2005 | Karp et al. |
| 6,893,547 B2 | 5/2005 | Gascoyne et al. |
| 6,916,113 B2 | 7/2005 | Van de Goor et al. |
| 6,919,046 B2 | 7/2005 | O'Connor et al. |
| 6,942,792 B2 | 9/2005 | Aso |
| 6,958,119 B2 | 10/2005 | Yin et al. |
| 6,981,522 B2 | 1/2006 | O'Connor et al. |
| 6,987,263 B2 | 1/2006 | Hobbs et al. |
| 6,991,729 B2 | 1/2006 | Ikeda et al. |
| 7,105,304 B1 | 9/2006 | Nikiforov et al. |
| 7,111,501 B2 | 9/2006 | Rocklin et al. |
| 7,112,277 B2 | 9/2006 | Bidlingmeyer et al. |
| 7,134,453 B2 | 11/2006 | Peters et al. |
| 7,143,785 B2 | 12/2006 | Maerkl et al. |
| 7,147,364 B2 | 12/2006 | Oohashi et al. |
| 7,178,386 B1 * | 2/2007 | Gamble ............. G01N 30/8665 |
| | | 73/61.52 |
| 7,204,139 B2 | 4/2007 | Takayama |
| 7,207,345 B2 | 4/2007 | Somerville |
| 7,241,423 B2 | 7/2007 | Golbig et al. |
| 7,261,812 B1 | 8/2007 | Karp et al. |
| 7,278,329 B2 | 10/2007 | Weissgerber et al. |
| 7,314,070 B2 | 1/2008 | Jeon et al. |
| 7,390,121 B2 | 6/2008 | Jahn et al. |
| 7,744,762 B2 | 6/2010 | Lazar |
| 7,887,753 B2 | 2/2011 | Quake et al. |
| 7,976,779 B2 | 7/2011 | Tai et al. |
| 8,329,407 B2 | 12/2012 | Ismagilov et al. |
| 8,511,889 B2 | 8/2013 | Choikhet et al. |
| 8,696,193 B2 | 4/2014 | Herbstritt |
| 8,764,279 B2 | 7/2014 | Castro et al. |
| 8,979,358 B2 | 3/2015 | Wiechers |
| 9,128,071 B2 | 9/2015 | Tsukada et al. |
| 9,527,010 B2 | 12/2016 | Williams et al. |
| 9,528,968 B2 | 12/2016 | Murphy et al. |
| 9,557,317 B2 | 1/2017 | Ozbal |
| 9,566,537 B2 | 2/2017 | Geng |
| 9,636,646 B2 | 5/2017 | Neerincx et al. |
| 9,679,757 B2 | 6/2017 | Netto et al. |
| 9,766,217 B2 | 9/2017 | Kidal et al. |
| 9,791,107 B2 | 10/2017 | Witt et al. |
| 9,884,266 B2 | 2/2018 | Dauphas et al. |
| 9,945,820 B2 | 4/2018 | Albrecht, Jr. |
| 9,968,894 B2 | 5/2018 | Shreve |
| 9,970,908 B2 | 5/2018 | Yotani et al. |
| 9,987,604 B2 | 6/2018 | Baaske et al. |
| 10,088,459 B2 | 10/2018 | Onoda et al. |
| 10,238,989 B2 | 3/2019 | Luongo et al. |
| 10,247,673 B2 | 4/2019 | Peterman et al. |
| 10,295,512 B2 | 5/2019 | Pohl et al. |
| 10,335,753 B2 | 7/2019 | De Corral et al. |
| 2002/0113095 A1 | 8/2002 | Jeon et al. |
| 2002/0134143 A1 | 9/2002 | Allington et al. |
| 2003/0077204 A1 | 4/2003 | Seki et al. |
| 2003/0123322 A1 | 7/2003 | Chung et al. |
| 2004/0092033 A1 | 5/2004 | Gustafson et al. |
| 2004/0096867 A1 | 5/2004 | Andersson et al. |
| 2004/0109793 A1 | 6/2004 | McNeely et al. |
| 2005/0118070 A1 | 6/2005 | Griss et al. |
| 2005/0252840 A1 | 11/2005 | Arnold et al. |
| 2006/0039829 A1 | 2/2006 | Suk et al. |
| 2006/0171864 A1 | 8/2006 | Caze et al. |
| 2006/0273012 A1 | 12/2006 | Dehmer |
| 2006/0280029 A1 | 12/2006 | Garstecki et al. |
| 2006/0285433 A1 | 12/2006 | Yang et al. |
| 2007/0113907 A1 | 5/2007 | Brennen et al. |
| 2007/0148048 A1 | 6/2007 | Jousse |
| 2007/0240989 A1 | 10/2007 | Levitan et al. |
| 2007/0263477 A1 | 11/2007 | Sudarsan et al. |
| 2007/0269894 A1 | 11/2007 | Howland et al. |
| 2008/0043570 A1 | 2/2008 | Arnold et al. |
| 2009/0044619 A1 | 2/2009 | Fiering et al. |
| 2009/0142846 A1 | 6/2009 | Crenshaw et al. |
| 2009/0148858 A1 | 6/2009 | Patel et al. |
| 2009/0207687 A1 | 8/2009 | Kemperman et al. |
| 2009/0255601 A1 | 10/2009 | Baeuerle et al. |
| 2009/0268548 A1 | 10/2009 | Hartmann et al. |
| 2010/0040483 A1 | 2/2010 | Berger et al. |
| 2010/0078086 A1 | 4/2010 | Guidat et al. |
| 2010/0159573 A1 | 6/2010 | Chung et al. |
| 2010/0189602 A1 | 7/2010 | Baeuerle et al. |
| 2011/0113866 A1 | 5/2011 | Finlay |
| 2011/0192217 A1 * | 8/2011 | Choikhet ............... G01N 30/34 |
| | | 366/182.2 |
| 2012/0309648 A1 | 12/2012 | Tseng et al. |
| 2013/0091933 A1 | 4/2013 | Tsukada et al. |
| 2014/0061133 A1 | 3/2014 | Herman |
| 2014/0230528 A1 | 8/2014 | Wang et al. |
| 2014/0345372 A1 | 11/2014 | Gerhardt et al. |
| 2016/0161454 A1 | 6/2016 | Jones et al. |
| 2017/0173496 A1 | 6/2017 | Stone |
| 2017/0333898 A1 | 11/2017 | Saleh et al. |
| 2018/0043320 A1 | 2/2018 | Ramsay et al. |
| 2018/0056252 A1 | 3/2018 | Steele et al. |
| 2018/0088091 A1 | 3/2018 | Cormier et al. |
| 2019/0070571 A1 * | 3/2019 | Jackson ................. B01F 33/30 |
| 2019/0070572 A1 | 3/2019 | MacKinnon et al. |
| 2019/0170706 A1 | 6/2019 | Gilar et al. |
| 2019/0265206 A1 | 8/2019 | Tarafder |
| 2019/0383777 A1 | 12/2019 | Inoue |
| 2020/0023295 A1 | 1/2020 | Moeller et al. |
| 2020/0025723 A1 | 1/2020 | Gilar et al. |
| 2020/0276728 A1 | 9/2020 | Zeko et al. |

FOREIGN PATENT DOCUMENTS

| | | |
|---|---|---|
| CN | 204116295 U | 1/2015 |
| CN | 106166453 a | 11/2016 |
| CN | 106422832 A | 6/2017 |
| CN | 106902662 A | 6/2017 |
| CN | 104076112 B | 9/2018 |
| CN | 109173766 A | 1/2019 |
| CN | 209333548 U | 9/2019 |
| CN | 110394105 A | 11/2019 |
| DE | 19902697 A1 | 7/2000 |
| DE | 102015100693 A1 | 7/2016 |
| DE | 102018104840 A1 | 4/2018 |
| EP | 1193496 A1 | 4/2002 |
| EP | 1566215 A2 | 8/2005 |
| EP | 1788388 A1 | 5/2007 |
| EP | 3179245 A1 | 6/2017 |
| FR | 3075068 A1 | 6/2019 |
| JP | S5191175 A | 8/1976 |
| JP | S6248428 U | 3/1987 |

(56) References Cited

FOREIGN PATENT DOCUMENTS

| | | |
|---|---|---|
| JP | S36295727 U | 6/1987 |
| JP | S62210042 A | 9/1987 |
| JP | H02167469 A | 6/1990 |
| JP | H06324026 A | 11/1994 |
| JP | H07159388 A | 6/1995 |
| JP | 2587162 Y2 | 12/1998 |
| JP | H02170047 A | 6/1999 |
| JP | 2603770 Y2 | 3/2000 |
| JP | 3665680 B2 | 6/2005 |
| JP | 2005211857 A | 8/2005 |
| JP | 2006003203 A | 1/2006 |
| JP | 3780917 B2 | 5/2006 |
| JP | 2006122735 A | 5/2006 |
| JP | 3865119 B2 | 1/2007 |
| JP | 2007090262 A | 4/2007 |
| JP | 3959436 B2 | 8/2007 |
| JP | 4043718 B2 | 2/2008 |
| JP | 4082309 B2 | 4/2008 |
| JP | 2009018311 A | 1/2009 |
| JP | 2009208052 A | 9/2009 |
| JP | 4348820 B2 | 10/2009 |
| JP | 4360206 B2 | 11/2009 |
| JP | 2010082533 A | 4/2010 |
| JP | 4683066 B2 | 5/2011 |
| JP | 5427603 B2 | 2/2014 |
| KR | 20020085903 A | 11/2002 |
| WO | 1997000125 A1 | 1/1997 |
| WO | 0022436 A1 | 4/2000 |
| WO | 2003015890 A1 | 2/2003 |
| WO | 2003024598 A1 | 3/2003 |
| WO | 2003098218 A1 | 11/2003 |
| WO | 2006017039 A1 | 2/2006 |
| WO | 2007021755 A2 | 2/2007 |
| WO | 2010015238 A1 | 2/2010 |
| WO | 2010030720 A1 | 3/2010 |
| WO | 2010107677 A1 | 3/2010 |
| WO | 2010083884 A1 | 7/2010 |
| WO | 2011003412 A2 | 1/2011 |
| WO | 2013187916 A1 | 12/2013 |
| WO | 2014034259 A1 | 3/2014 |
| WO | WO-2014034259 A1 * 3/2014 ............ B01F 3/0861 |
| WO | 2016082520 A1 | 6/2016 |
| WO | 2018226907 A2 | 12/2018 |
| WO | 2019086671 A1 | 5/2019 |
| WO | 2019097490 A1 | 5/2019 |
| WO | 2019167011 A1 | 9/2019 |
| WO | 2019186223 A1 | 10/2019 |
| WO | 2019204508 A1 | 10/2019 |
| WO | 2019229819 A1 | 12/2019 |
| WO | 2019240653 A1 | 12/2019 |
| WO | 2020099865 A1 | 5/2020 |

OTHER PUBLICATIONS

Nguyen, Nam-Trung and Steven T. Wereley, "Fundamentals and Applications of Microfluidics, Second Edition," 2006, Artech House, Inc., p. 380.

Jeon, et al., "Generation of Solution and Surface Gradients Using Microfluidic Systems," Langmuir 2000, vol. 16, No. 22, pp. 8311-8316.

"Appropriate Mixer Volume for HPLC and UHPLC Applications," Oct. 11, 2014. https://hplctips.blogspot.com/2014/10/appropriate-mixer-volume-for-hplc-and.html.

"HyperShear(TM) HPLC and UHPLC Mixers" 2014, Analytical Scientific Instruments US, Inc.

Chen, et al. "Combining selection valve and mixing chamber for nanoflow gradient generation: Toward developing a liquid chromatography cartridge coupled with mass spectrometer for protein and peptide analysis." Analytica Chimica Acta 887 (2015) pp. 230-236.

Davis, et al. "A Sample, Reliable Rapid-Mixing Apparatus for Continuous-Flow Studies," Analytical Biochemistry 97 (1979) pp. 428-437.

Huft, et al. "Microfluidic Integration of Paralell Solid-Phase Liquid Chromatography," Analytical Chemistry 85 (2013) 2999-3005.

Shi, et al., "Mixing enhancement via a serpentine micromixer for real-time activation of carboxyl," Chemical Engineering Journal, 2019. https://doi.org/10.1016/j.cej.2019.123642.

"Reliable Solvent Mixing in UHPLC," Thermo Fisher Scientific, Inc., 2016.

Gilbert, Scott "Lab-on-a-chip miniaturized on-line liquid chromatography," Crystal Vision Microsystems, CPAC Satellite Workshop, Rome, Italy, Mar. 20-22, 2006.

Chisolm, et al. "Development and characterization of 'push-pull' sampling device with fast reaction quenching coupled to high-performance liquid chromatography for pharmaceutical process analytical technologies," Journal of Chromatography A 1217 (2010) 7471-7477.

Engelhardt, Heinz and Helmut Elgass, "Problems in the application of gradient elution to high-pressure liquid chromatography," Journal of Chromatography 112 (1975) pp. 415-423.

Kaminski, et al. "Programming the Elution Gradient in High-Performance Chromatography By Varying The Volume Of the Mixing Chambers," Journal of Chromatography 176 (1979) pp. 171-180.

Kostanyan, Artak E. and Andrei A. Voshkin, "Support-free pulsedliquid-liquid chromatogrpahy," Journal of Chromatography A 1216 (2009) pp. 7761-7766.

Takeuchi, Toyohide and Daido Ishii, "Continuous Gradient Elution in Micro High-Performance Liquid Chromatography," Journal of Chromatography 253 (1982) pp. 41-47.

Wang, et al. "On-line two-dimensional countercurrent chromatography × high performance liquid chromatography system with a novel fragmentarydilution and turbulent mixing interface for preparation of coumarinsfrom Cnidium monnieri" Journal of Chromatography A, 1406 (2015) pp. 215-223.

"Dynamic Mixing Chamber Manual V.7119-1," Knauer, Berlin, Germany, Aug. 2016.

"HPLC Gradient Mixers," Mott, 2020. https://mottcorp.com/product/mixers/hplc-gradient-static-mixers/.

Ianovska, et al. "Development of small-volume microfluidic chaotic mixers for future application in two-dimensional liquid chromatography," RSC Adv., 2017, 7, pp. 9090-9099.

Lawati, et al. "Combination of capillary micellar liquid chromatography with on-chip microfluidic chemiluminescence detection for direct analysis of buspirone in human plasma," Talanta 127 (2014) pp. 230-238.

Qian, Shizhi and Haim H. Bau, "Magneto-hydrodynamics based microfluidics," Mechanics Research Communications 36 (2009) 10-21.

Steele, et al. "Reducing HPLC/UHPLC System Noise and Volume with High Performance Static Mixers," Feb. 26, 2017, Mott Corporation.

"Varian Dual Chamber Dynamic Mixer Instruction Manual," Varian, Publication No. 0391467400, Issue 5, Feb. 2009.

International Preliminary Report on Patentability in PCT/US2021/051533 dated Apr. 6, 2023.

* cited by examiner

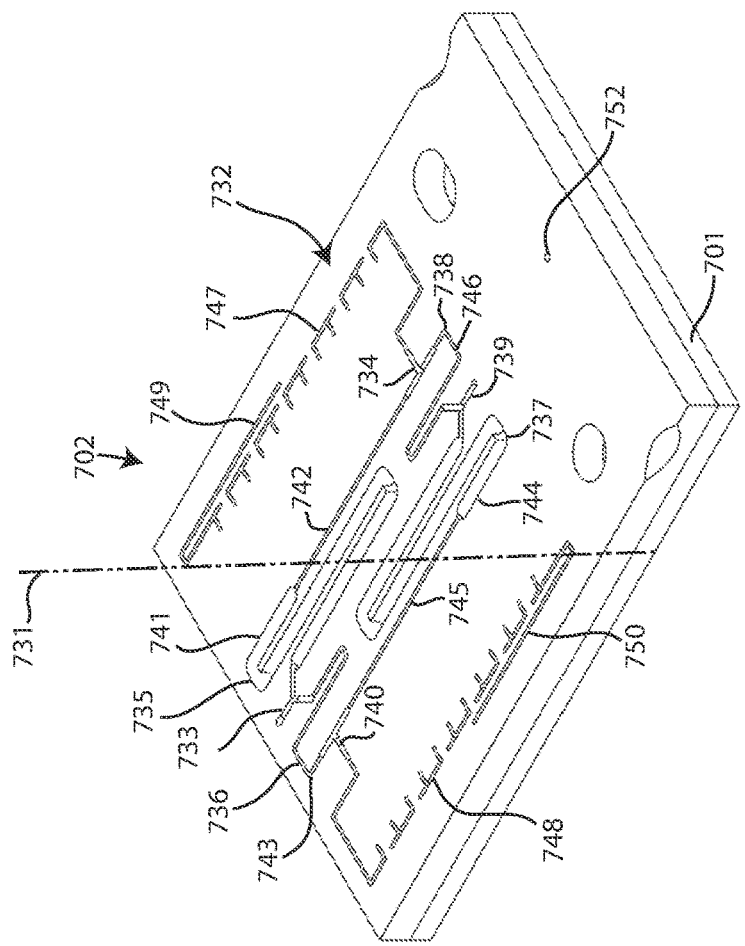
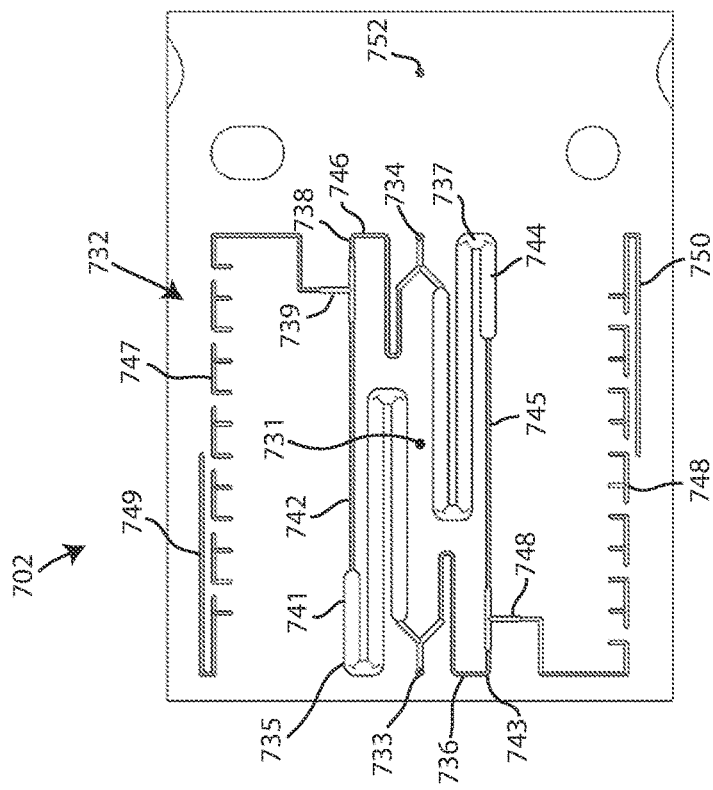
FIG. 10B
FIG. 10A

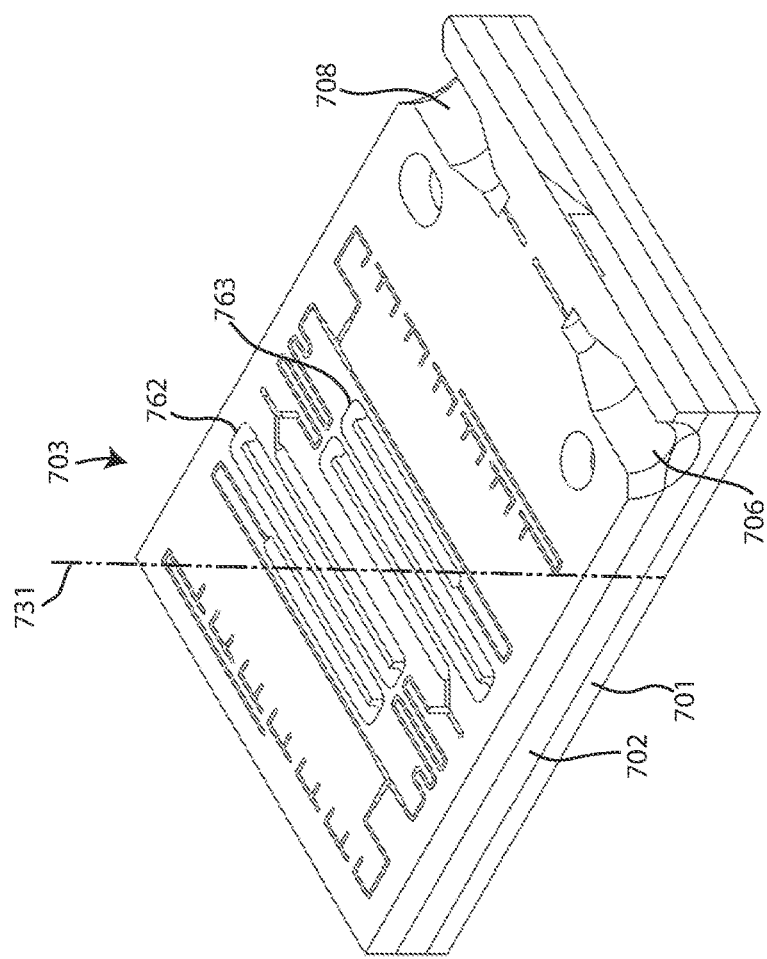
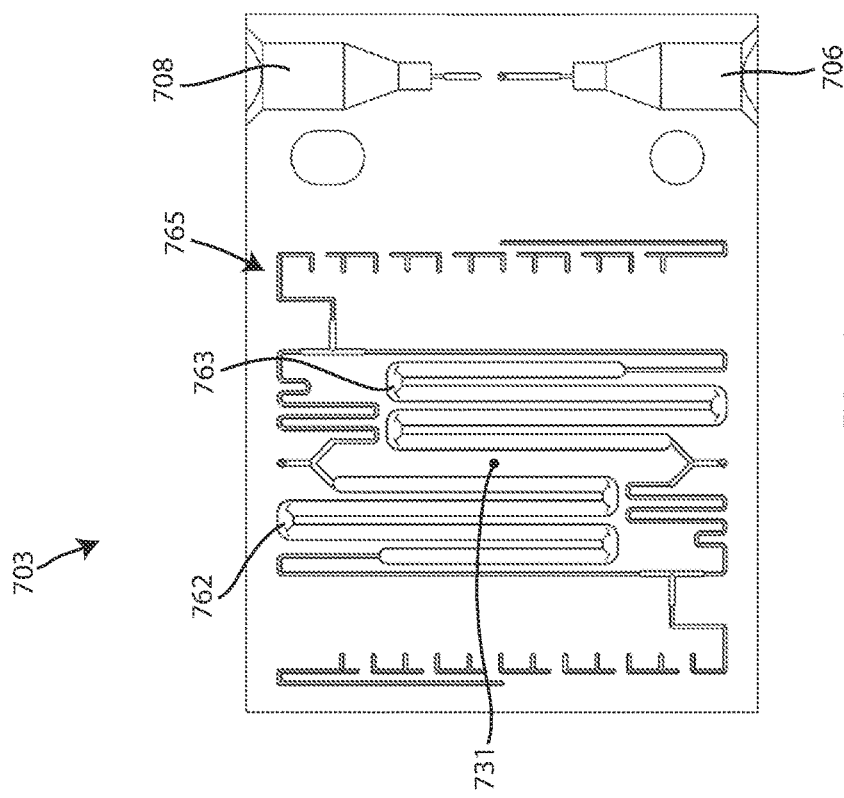
FIG. 11B
FIG. 11A

CONTINUOUS FLOW MIXER

RELATED APPLICATION

This application claims the benefit of the earlier filing date of U.S. Provisional Patent Application Ser. No. 63/081,513 filed Sep. 22, 2020 and titled "Continuous Flow Mixer," the entirety of which is incorporated herein by reference.

FIELD OF THE INVENTION

The invention relates generally to chromatography. More particularly, the invention relates to a continuous flow mixer for use in chromatography systems.

BACKGROUND

Chromatography is a set of techniques for separating a mixture into its constituents. Well-established separation technologies for fluid chromatography systems include HPLC (High Performance Liquid Chromatography), UPLC (Ultra Performance Liquid Chromatography) and SFC (Supercritical Fluid Chromatography). HPLC systems use high pressure, ranging traditionally between 1,000 psi (pounds per square inch) to approximately 6,000 psi, to generate the flow required for liquid chromatography (LC) in packed columns. Compared to HPLC, UPLC systems use columns with smaller particulate matter and higher pressures approaching 20,000 psi to deliver the mobile phase. SFC systems use highly compressible mobile phases, which typically employ carbon dioxide ($CO_2$) as a principle component.

In many of these fluid chromatography applications, it is desirable to mix fluids that are flowing continuously. For example, in liquid chromatography, a pump is used to deliver precise compositions of solvents to a chromatographic column for the purpose of separating liquid mixtures. The flow composition delivered by the pump can vary in time, and it is desirable to blend or mix the stream as it flows for the purpose of smoothing out compositional discontinuities that can cause interference with sample detection. In most cases, liquid chromatography systems operate in a laminar flow regime, where turbulence is not available to aid in mixing, and mixers require creative designs to promote controlled dispersion. Various mixers exist which seek to achieve a desirable mixing of fluids in liquid chromatography systems. For example, large volume mixers exist that mix effectively, but do so with an increase in volume which must be flown-through by a fluid or solvent, thereby drastically increasing testing time and diminishing throughput. Packed-bead LC mixers are one example, they are inefficient relative to their delay volume, are difficult to manufacture, and are prone to contamination and clogging.

Testing has shown that one of the dominant sources of compositional noise is due to the pump stroke in a fluid chromatography application. Since pumps tend to be piston or syringe-style positive displacement pumps, pumps deliver flow to the system in discrete strokes. Within a given stroke, the volume of solvent can be fairly well-mixed, but there tends to be a discontinuity in composition between strokes, and under certain chromatographic conditions this results in noise introduced at the stroke frequency of the pump, which can decrease the precision of sample quantification and render some samples undetectable.

Thus, a mixer that eliminates or reduces the above-described deficiencies would be well received in the art.

SUMMARY

In one exemplary embodiment, a fluid chromatography system includes at least one solvent reservoir, at least one pump connected to the at least one solvent reservoir configured to pump a flow of solvent from the at least one solvent reservoir downstream, and a continuous flow mixer downstream from the at least one pump. The mixer includes a mixer inlet configured to receive an inlet flow of fluid, a mixer outlet configured to provide an outlet flow of the fluid, and a first channel structure located between the mixer inlet and the mixer outlet. The first channel structure includes a first inlet branch, a second inlet branch, a plurality of outlet branches including at least a first outlet branch and a second outlet branch, a first plurality of branches splitting from the first inlet branch, each branch of the first plurality of branches connected to a different of the plurality of outlet branches, and a second plurality of branches splitting from the second inlet branch, each branch of the second plurality of branches connected to a different of the plurality of outlet branches. At least two branches of the first and second plurality of branches that are connected to the first outlet branch are offset in fluid residence time through the at least two branches.

Additionally or alternatively, the first channel structure is axially or radially symmetric.

Additionally or alternatively, the first plurality of branches includes a first branch and a second branch, and the second plurality of branches includes a third branch and a fourth branch, and the first branch and the fourth branch are each connected to the first outlet branch, and the second branch and the third branch are each connected to the second outlet branch.

Additionally or alternatively, the first branch includes a greater volume region and a flow restrictor region and the second branch includes a flow restrictor region such that flow rate is the same through each of the first branch and the second branch, and the third branch includes a greater volume region and a flow restrictor region and the fourth branch includes a flow restrictor region such that flow rate is the same through each of the third branch and the fourth branch, and flow time is delayed through the first branch relative to the fourth branch and wherein the flow time is delayed through the second branch relative to the third branch.

Additionally or alternatively, the continuous flow mixer further includes a flow dispersion channel structure located downstream from at least one of the first outlet branch and the second outlet branch.

Additionally or alternatively, the continuous flow mixer further includes a second channel structure located between the mixer inlet and the mixer outlet, wherein the first channel structure comprises a first stage and wherein the second channel structure comprises a second stage. The second channel structure includes a first inlet branch; a second inlet branch; a plurality of outlet branches including at least a first outlet branch and a second outlet branch, a first plurality of branches splitting from the first inlet branch, each branch of the first plurality of branches connected to a different of the plurality of outlet branches, and a second plurality of branches splitting from the second inlet branch, each branch of the second plurality of branches connected to a different of the plurality of outlet branches. At least two branches of the first and second plurality of branches that are connected to the first outlet branch are offset in fluid residence time through the at least two branches.

Additionally or alternatively, the first plurality of branches of the second channel structure includes a first branch and a second branch, and wherein the second plurality of branches of the second channel structure includes a third branch and a fourth branch, and wherein the first branch and the fourth branch of the second channel structure are each connected to the first outlet branch of the second channel structure, and wherein the second branch and the third branch of the second channel structure are each connected to the second outlet branch of the second channel structure.

Additionally or alternatively, the first branch of the second channel structure includes a greater volume region and a flow restrictor region and the second branch of the second channel structure includes a flow restrictor region such that flow rate is the same through each of the first branch and the second branch of the second channel structure, and the third branch of the second channel structure includes a greater volume region and a flow restrictor region and the fourth branch of the second channel structure includes a flow restrictor region such that flow rate is the same through each of the third branch and the fourth branch of the second channel structure. Flow time is delayed through the first branch of the second channel structure relative to the fourth branch and wherein the flow time is delayed through the second branch of the second channel structure relative to the third branch.

Additionally or alternatively, the greater volume region of the first and third branches of the second channel structure of the second stage has a different volume than the greater volume region of the first and third branches of the first channel structure.

According to another embodiment, a continuous flow mixer for use in a chromatography system includes a mixer inlet configured to receive an inlet flow of fluid, a mixer outlet configured to provide an outlet flow of the fluid, and a first channel structure located between the mixer inlet and the mixer outlet. The first channel structure includes a first inlet branch, a second inlet branch, a plurality of outlet branches including at least a first outlet branch and a second outlet branch, a first plurality of branches splitting from the first inlet branch, each branch of the first plurality of branches connected to a different of the plurality of outlet branches, and a second plurality of branches splitting from the second inlet branch, each branch of the second plurality of branches connected to a different of the plurality of outlet branches. At least two branches of the first and second plurality of branches that are connected to the first outlet branch are offset in fluid residence time through the at least two branches.

Additionally or alternatively, the first channel structure is axially or radially symmetric.

Additionally or alternatively, the first plurality of branches includes a first branch and a second branch, and the second plurality of branches includes a third branch and a fourth branch, the first branch and the fourth branch are each connected to the first outlet branch, and the second branch and the third branch are each connected to the second outlet branch.

Additionally or alternatively, the first branch includes a greater volume region and a flow restrictor region and the second branch includes a flow restrictor region such that flow rate is the same through each of the first branch and the second branch, and the third branch includes a greater volume region and a flow restrictor region and the fourth branch includes a flow restrictor region such that flow rate is the same through each of the third branch and the fourth branch. Flow time is delayed through the first branch relative to the fourth branch and wherein the flow time is delayed through the second branch relative to the third branch.

Additionally or alternatively, the mixer includes a flow dispersion channel structure located downstream from at least one of the first outlet branch and the second outlet branch.

Additionally or alternatively, the mixer includes a second channel structure located between the mixer inlet and the mixer outlet, wherein the first channel structure comprises a first stage and wherein the second channel structure comprises a second stage. The second channel structure includes a first inlet branch, a second inlet branch, a plurality of outlet branches including at least a first outlet branch and a second outlet branch, a first plurality of branches splitting from the first inlet branch, each branch of the first plurality of branches connected to a different of the plurality of outlet branches, and a second plurality of branches splitting from the second inlet branch, each branch of the second plurality of branches connected to a different of the plurality of outlet branches. At least two branches of the first and second plurality of branches that are connected to the first outlet branch are offset in fluid residence time through the at least two branches.

Additionally or alternatively, the first plurality of branches of the second channel structure includes a first branch and a second branch, and the second plurality of branches of the second channel structure includes a third branch and a fourth branch, and the first branch and the fourth branch of the second channel structure are each connected to the first outlet branch of the second channel structure, and the second branch and the third branch of the second channel structure are each connected to the second outlet branch of the second channel structure.

Additionally or alternatively, the first branch of the second channel structure includes a greater volume region and a flow restrictor region and the second branch of the second channel structure includes a flow restrictor region such that flow rate is the same through each of the first branch and the second branch of the second channel structure, and the third branch of the second channel structure includes a greater volume region and a flow restrictor region and the fourth branch of the second channel structure includes a flow restrictor region such that flow rate is the same through each of the third branch and the fourth branch of the second channel structure. Flow time is delayed through the first branch of the second channel structure relative to the fourth branch and wherein the flow time is delayed through the second branch of the second channel structure relative to the third branch.

Additionally or alternatively, the greater volume region of the first and third branches of the second channel structure of the second stage has a different volume than the greater volume region of the first and third branches of the first channel structure.

According to another embodiment, a method of mixing fluid in a fluid chromatography system includes providing a fluid, by at least one fluidic pump, to a mixer, receiving the fluid by a mixer inlet of the mixer. The method further includes distributing the received fluid through a channel structure located downstream from the inlet, the channel structure including a first stage that includes a plurality of channel structure inlet branches and a plurality of outlet branches, and a plurality of branches located between the plurality of inlet branches and the plurality of outlet branches such that any given portion of the received fluid flows through only one of the plurality of inlet branches and only one of the plurality of channel structure. At least two branches of the plurality of branches that are connected to the first outlet branch are offset in residence time. The method includes providing an outlet flow of the fluid from the continuous flow mixer.

Additionally or alternatively, the method includes delaying a portion of the received fluid by at least one of the plurality of branches relative to at least one other of the plurality of branches.

In another exemplary embodiment, a continuous flow mixer for use in a chromatography system comprises: an inlet configured to receive an inlet flow of fluid; an outlet configured to provide an outlet flow of fluid; and a radially or axially symmetric channel structure located between the inlet and the outlet, the radially or axially symmetric channel structure configured to split the inlet flow of fluid into a first plurality of radially symmetric branches.

Additionally or alternatively, the end of each of the first plurality of radially symmetric branches, fluid flow is split tangentially in two directions.

Additionally or alternatively, the inlet is a central inlet located at a central axis of the continuous flow mixer, and wherein each of the radially symmetric branches extends radially outwardly from the inlet, and further wherein a first concentric fluid channel connects each of the radially symmetric branches.

Additionally or alternatively, each of the first plurality of radially symmetric branches and the first concentric fluid channel comprises a first concentric stage and wherein the radially or axially symmetric channel structure further includes a second concentric stage extending in a radial direction from the first concentric stage, wherein the second concentric stage includes a second concentric fluid channel and a second plurality of radially symmetric branches.

Additionally or alternatively, each of the first plurality of radially symmetric branches and the first concentric fluid channel comprises a first concentric stage and wherein the radially or axially symmetric channel structure further includes a second concentric stage spaced apart in an axial direction from the first concentric stage, wherein the second concentric stage includes a second concentric fluid channel and a second plurality of radially symmetric branches.

Additionally or alternatively, at least a portion of the flow through each of the first plurality of radially symmetric branches is recombined with flow through other of the radially symmetric branches within the first concentric fluid channel.

Additionally or alternatively, the radially or axially symmetric channel structure includes a second plurality of radially symmetric branches extending from the first concentric fluid channel, and wherein the second plurality of radially symmetric branches are not centered with the first plurality of radially symmetric branches.

Additionally or alternatively, the first concentric fluid channel includes a volume offset region for each of the first plurality of radially symmetric branches.

Additionally or alternatively, the volume offset region is located at the outlet of each of the first plurality of radially symmetric branches and extends in one of the two directions.

In another exemplary embodiment, a fluid chromatography system comprises: at least one solvent reservoir; at least one pump connected to the at least one solvent reservoir configured to pump a flow of solvent from the at least one solvent reservoir downstream; and a continuous flow mixer downstream from the at least one pump, the mixer including: an inlet configured to receive an inlet flow of fluid; an outlet configured to provide an outlet flow of fluid; and a radially or axially symmetric channel structure located between the inlet and the outlet, the radially or axially symmetric channel structure configured to split the inlet flow of fluid into a plurality of radially symmetric branches.

Additionally or alternatively, at the end of each of the first plurality of radially symmetric branches, fluid flow is split tangentially in two directions.

Additionally or alternatively, the inlet is a central inlet located at a central axis of the continuous flow mixer, and wherein each of the radially symmetric branches extends radially outwardly from the inlet, and further wherein a first concentric fluid channel fluid channel connects each of the radially symmetric branches.

Additionally or alternatively, each of the first plurality of radially symmetric branches and the first concentric fluid channel comprises a first concentric stage and wherein the radially or axially symmetric channel structure further includes a second concentric stage extending in a radial direction from the first concentric stage, wherein the second concentric stage includes a second concentric fluid channel and a second plurality of radially symmetric branches.

Additionally or alternatively, the first concentric stage includes a first volume offset that targets a full stroke volume of the at least one pump, and wherein the second concentric stage includes a second volume offset that targets a half stroke volume of the at least one pump, and wherein the first concentric stage is connected to the second concentric stage in series.

Additionally or alternatively, each of the first plurality of radially symmetric branches and the first concentric fluid channel comprises a first concentric stage and wherein the radially or axially symmetric channel structure further includes a second concentric stage spaced apart in an axial direction from the first concentric stage, wherein the second concentric stage includes a second concentric fluid channel and a second plurality of radially symmetric branches.

Additionally or alternatively, at least a portion of the flow through each of the first plurality of radially symmetric branches is recombined with flow through another of the radially symmetric branches within the first concentric fluid channel.

Additionally or alternatively, the radially or axially symmetric channel structure includes a second plurality of radially symmetric branches extending from the first concentric fluid channel, and wherein the second plurality of radially symmetric branches are not centered with the first plurality of radially symmetric branches.

Additionally or alternatively, the first concentric fluid channel includes a volume offset region for each of the first plurality of radially symmetric branches.

Additionally or alternatively, the volume offset region is located at the outlet of each of the first plurality of radially symmetric branches and extends in one of the two directions.

Additionally or alternatively, the volume offset regions are optimized based on a stroke volume of the at least one pump.

Additionally or alternatively, the total volume offset of each stage of the radially or axially symmetric channel structure is equal to 25% of the full-stroke volume of the at least one pump.

Additionally or alternatively, the symmetry axis of the radially or axially symmetric channel structure is aligned with the gravity vector of the radially or axially symmetric channel structure.

In another exemplary embodiment, a method of mixing fluid in a fluid chromatography system comprises: providing a fluid, by at least one fluidic pump, to a mixer; receiving the fluid by an inlet; distributing the received fluid through a radially symmetric channel structure located downstream from the inlet; and splitting flow of the fluid through the radially symmetric channel structure into a first plurality of radially symmetric branches.

Additionally or alternatively, the method further includes splitting flow of the fluid tangentially in two directions at the end of each of the first plurality of radially symmetric branches.

Additionally or alternatively, the method further includes splitting flow of the fluid at the end of each of the first plurality of radially symmetric branches into a counterclockwise and clockwise flow through a concentric ring that connects each of the radially symmetric branches.

Additionally or alternatively, wherein each of the first plurality of radially symmetric branches and the concentric ring comprises a first concentric stage and wherein the radially symmetric channel structure further includes a second concentric stage extending in a radial direction from the first concentric stage, wherein the second concentric stage includes a second ring and a second plurality of radially symmetric branches, and the method further includes flowing the fluid through each of the first concentric stage and the second concentric stage.

Additionally or alternatively, the method further includes targeting a full stroke volume of the at least one fluidic pump with a volume offset located within the first concentric stage; and targeting a half stroke volume of the at least one fluidic pump with a second volume offset located within the second concentric stage.

Additionally or alternatively, the method further includes recombining the flow through each of the first plurality of radially symmetric branches with another of the radially symmetric branches within the concentric ring fluid channel.

Additionally or alternatively, the method further includes offsetting the flow of the fluid through the concentric ring with at least one volume offset region for each of the first plurality of radially symmetric branches.

Additionally or alternatively, the method further includes optimizing the volume offset regions based on a stroke volume of the at least one pump.

Additionally or alternatively, the method further includes aligning the symmetry axis of the radially symmetric channel structure with the gravity vector of the radially symmetric channel structure.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

FIG. 10A depicts a top view of a second layer of the mixer of FIG. 8.

FIG. 10B depicts a perspective view of the second layer of FIG. 10A stacked above the first layer of FIGS. 9A and 9B.

FIG. 11A depicts a top view of a third layer of the mixer of FIG. 8.

FIG. 11B depicts a perspective view of the third layer of FIG. 11A stacked above the first layer of FIGS. 9A and 9B and the second layer of FIGS. 10A and 10B.

DETAILED DESCRIPTION

Figure 1:
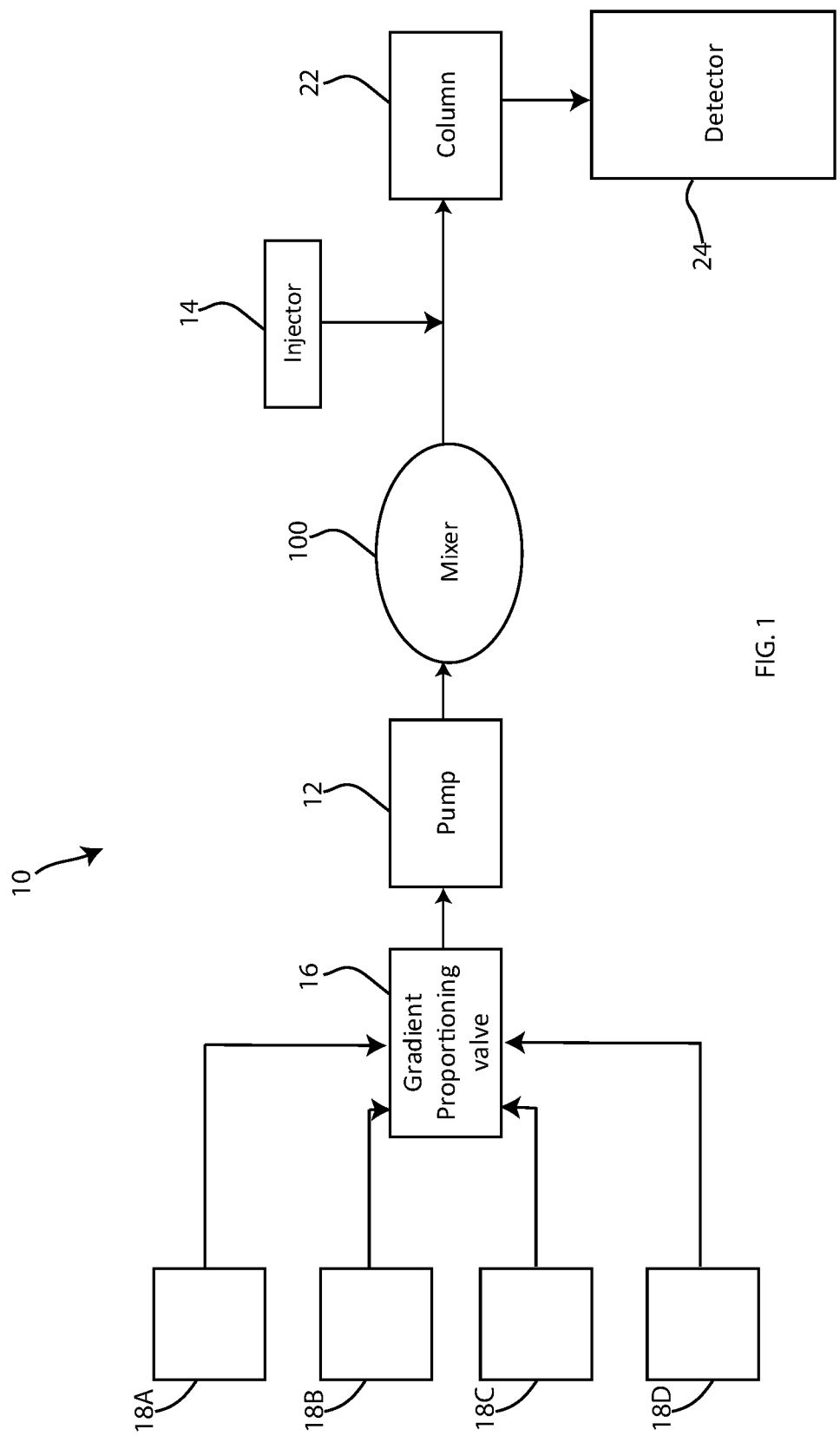
FIG. 1 depicts a block diagram of an embodiment of a liquid chromatography system, in accordance with one embodiment.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

In brief overview, the invention relates to a mixer for use in chromatography systems that splits the flow of fluid into a plurality of radially symmetric branches, in order to provide for mixing. Embodiments described herein include one or more of the following desirable traits of a liquid chromatography mixer: ability to operate passively; ease of manufacture, consistent performance, and efficient mixing of a continuous flow stream with respect to pressure drop and delay volume. Mixers described herein are configured to mix longitudinally, i.e. along the flow direction, and may provide for a smaller delay volume than an equivalent packed-bead mixer.

Moreover, mixers described herein may be configured for any setting where a continuous flow of fluid needs to be mixed. Particular embodiments described herein are geared toward fluid chromatography applications, and more particularly to liquid chromatography systems (i.e. HPLC and/or UPLC). However, embodiments may also be applicable to supercritical fluid systems (SFC). Any system in which fluid mixing is required may be applicable to the mixer embodiments described herein.

Mixers consistent with the present invention may further be configured to cancel and/or otherwise reduce fluidic oscillations in composition that depart from a desired composition by one or more frequencies. For example, in cases described herein, one or more pumps (e.g. a single quaternary pump or two binary pumps) located upstream from the mixer may be configured to pump fluid downstream to the mixer. However, prior to mixing by the mixer, the composition expelled by the pump is not sufficiently mixed. Depending on the pump, the composition downstream from the pump oscillate from a desired composition, referred to in the art as "compositional ripple." Such unwanted compositional variance may occur at frequencies dependent on the upstream pump system being used, and may become known to a chromatography system designer such that the mixer may be particularly configured to cancel or reduce one or more the frequencies in composition ripple or variance in accordance with embodiments described herein below.

Mixers described herein may be configured to reduce or cancel this unwanted compositional ripple whether the pump is set to pump a constant composition of solvent, or alternatively set to deliver a gradient. In either situation, there is a desired composition at a given point in time. Any departure from that desired composition, in the form of a compositional oscillation at a given frequency, is unwanted and may be prevented by the mixers described herein.

Embodiments of the present invention further provide radially symmetric split flow mixers in which a fluid flow that enters an inlet is split into two or more fluidic paths. The radially symmetric mixer may include a channel structure located between the inlet and the outlet that includes a plurality of branches. At the end of each branch, the flow may be configured to split into two directions, connecting to the next branch in a parallel, radially symmetric configuration that resembles a ring. A plurality of stages may be included in which the ring provides fluid, via additional branches, to an additional ring. Mixer stages may extend outwardly radially as concentric rings, or may alternatively extend axially as rings stacked one upon the other. A radially symmetric structure has been found to be particularly advantageous in mixing fluids for fluid chromatography, such as liquid chromatography.

The radially symmetric split flow mixers described herein may be used to longitudinally blend the output from a quaternary pump with a specific volume offset. The volume offset of the radially symmetric split flow mixers described herein may be sized to specifically target the noise frequencies of the pump, such as the full stroke volumetric frequency, the half-stroke volumetric frequency and/or harmonic frequencies thereof. Additionally, the volume offset may be configured to target characteristic noise frequencies that may not correspond directly to the pump stroke, and which may be desired to target in addition to or alternatively from the stroke volumes of the pump. The symmetry of the split flow mixers described herein may provide benefits such as extensibility, geometric flexibility, obviation of gravitational artefacts, and enhanced control over length scales and pressure drops for optimization.

FIG. 1 shows an embodiment of an exemplary liquid chromatography system 10 for separating a sample into its constituents. The liquid chromatography system 10 can be an HPLC, UPLC, or the like. The liquid chromatography system 10 includes a solvent delivery system that includes a plurality of solvent reservoirs 18A, 18B, 18C, 18D. The solvent reservoirs are connected to a gradient proportioning valve 16 which provides the combined solvents to a quaternary pump 12. The quaternary pump 12 draw solvents through a fluidic conduit, which may be a fluidic conduit, line, tube or channel.

While not shown, other embodiments of the liquid chromatography system 10 contemplated may be a binary pump system having two binary pumps (i.e. using a binary solvent manager BSM system). Thus, the present invention may be included in a BSM system including two high pressure mixing pumps in which frequencies due to the pump cycle cause flow perturbations. In such instances, the frequencies of unwanted compositional fluctuations may be fixed in these BSM systems. Hereinafter, while the quaternary pump 12 is shown, it should be understood that the mixers described herein, and concepts described herein, are applicable to BSM systems as well as quaternary solvent manager (QSM) systems.

The quaternary pump 12 may have a single pair of pump heads and alter the composition via a switching valve upstream of the pump 12. The quaternary pump 12 may be configured to deliver up to four different solvents (as shown, solvents from reservoirs 18A, 18B, 18C, 18D) with the switching valve. Compositional ripple as described herein occurs because only one solvent is delivered at a time to the quaternary pump 12 by the gradient proportioning valve 16. The valve 16 alternates between the solvents rapidly to achieve the commanded composition. However, the solvents may not fully blend in the pump heads. Additionally, during a gradient where the set composition is changing over time, each pump stroke has a different composition. Thus, the quaternary pump 12 in this case creates an undesirable staircase-shaped delivered composition curve that needs additional mixing for proper detection downstream.

Figure 2:
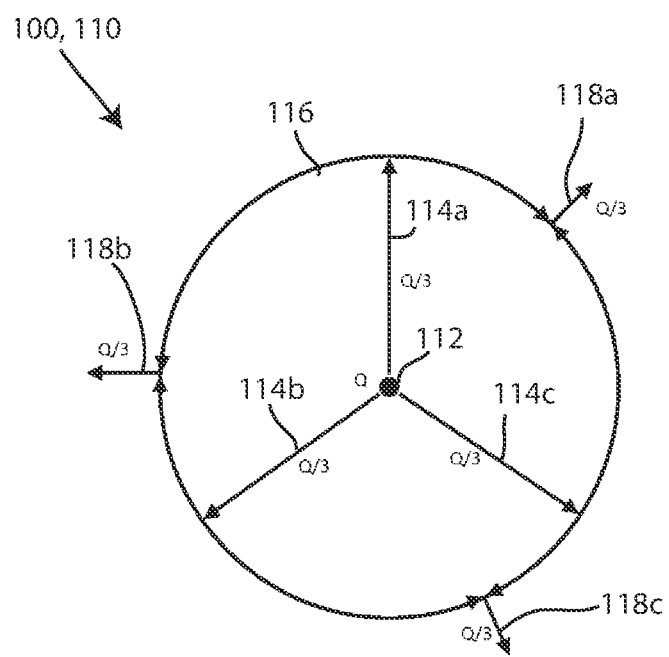
FIG. 2 depicts a schematic diagram of an embodiment of a mixer for a liquid chromatography system.

Downstream from the quaternary pump 12 may be a mixer 100. The mixer 100 may be configured to passively mix the pumped fluid in accordance to the embodiments described herein. The specific features of mixer 100 is shown in FIG. 2 and described in more detail herein below. However, it should be understood that liquid chromatography systems contemplated herein can include any mixer consistent with the mixer embodiments described herein, such as mixers 200, 300, 400, 500 shown in FIGS. 3-6.

Downstream from the mixer 100 is shown an injector 14. The injector 14 may be included as a feature of a sample manager or other assembly or sub-system configured to inject a sample into the flow of fluid coming from the mixer 100. The injector 14 may include an injector valve with a sample loop. The sample manager may control the injection of the sample and may operate in one of two states: a load state and an injection state. In the load state, the position of the injector valve of the injector 14 is such that the solvent manager loads the sample into the sample loop; in the injection state, the position of the injector valve of the injector 14 changes so that solvent manager introduces the sample in the sample loop into the continuously flowing mobile phase arriving from the mixer 100.

With the injector valve of the injector 14 in the injection state, the mobile phase carries the sample into a column 22. The chromatography column 22 is in fluidic communication with the injector 14 through, for example, a fluidic tube. The chromatography column 22 may be configured to perform sample separation according to techniques known in the art. Another fluidic tube couples the output port of the column 22 to a detector 24, for example, a mass spectrometer, a UV detector, or any other detector. Through the fluidic tube, the detector 24 may be configured to receive the separated components of the sample from the column 22 and produce an output from which the identity and quantity of analytes of the sample may be determined. Noise in the absorbance of the separated components over time may be reduced by the mixers described herein.

The liquid chromatography system 10 is shown for exemplary purposes, and the various features shown may be modified, changed or replaced with any features of any known liquid chromatography system without departing from the scope of the invention. Furthermore, while the invention is shown by way of example with a liquid chromatography system, mixers described herein may be deployed with any fluidic system, including supercritical fluid chromatography (SFC) systems or even non-chromatography applications.

In one exemplary embodiment of the liquid chromatography system 10 shown above, two solvents are delivered from each of solvent reservoirs 18A and 18B. The other solvent reservoirs 18C and 18D may not be used in this embodiment. The solvent from reservoir 18A may be water with 0.1% trifluoroacetic acid (TFA). The solvent from reservoir 18B may be acetonitrile (ACN) with 0.1% TFA. In such an embodiment, more TFA sticks to the column when solvent from reservoir 18A passes through, less sticks when solvent from reservoir 18B passes through. In this manner, oscillations in the composition will cause the amount of TFA leaving the column to oscillate. The TFA in the compositions absorbs light at the wavelength the detector 24 is observing. Thus, the mixer 100 is configured to prevent noise waves seen in the baseline of the chromatogram that would otherwise be present if unwanted oscillations in the composition, or "compositional ripple" was present. Such oscillations would interfere with the quantification of the size of sample peaks and thereby are desirable to prevent by the mixer 100 in accordance with embodiments described herein.

FIG. 2 depicts a schematic diagram of an embodiment of the mixer 100 of the liquid chromatography system of FIG. 1, in accordance with one embodiment. The mixer 100 may be a passive mixer, in that it does not require any power or controlling. The mixer 100 may be a continuous split flow mixer. Putting the mixer 100 in line within a chromatography system such as the chromatography system 10 allows the mixer 100 to function as intended to mix a continuous flow stream entering the mixer 100 efficiently with respect to both pressure drop and delay volume.

The mixer 100 is shown having a radially symmetric channel structure 110.

Specifically, the radially symmetric channel structure includes an inlet 112 configured to receive a flow of fluid, a plurality of radially symmetric branches 114a, 114b, 114c extending radially outwardly from the inlet 112, a concentric ring 116 surrounding the radially symmetric branches 114a, 114b, 114c, and a plurality of outlet branches 118a, 118b, 118c extending radially outwardly from the concentric ring 116. In other embodiments, the outlet branches 118a, 118b, 118c may extend in the axial direction instead.

The radially symmetrical channel structure 110 may be configured to provide various benefits in fluidic mixing. For example, the radially symmetrical channel structure 110 may also be axisymmetric about a center axis extending through the inlet 112. Axisymmetry may be used to avoid gravity-driven flow effects when the mixer is placed into a liquid chromatography system, such as the system 10. Further, the symmetrical nature (i.e. the radial symmetry and/or axial symmetry) may provide for equal flow distribution through the mixer 100.

The inlet 112 is shown to be a central inlet located at a central axis of the mixer 100. The radially symmetric branches 114a, 114b, 114c are shown extending radially about the inlet 112. While the mixer 100 is shown with three radially symmetric branches 114a, 114b, 114c extending radially outwardly from the inlet 112 and spaced apart symmetrically (i.e. 120 degree spacing), other embodiments may include any number of equispaced branches. For example, as few as two branches may be provided with 180 degree spacing. Four branches with 90 degree spacing, 5 branches with 72 degree spacing, or 6 branches with 60 degree spacing, are contemplated.

The radially symmetric branches 114a, 114b, 114c are shown extending radially outwardly to the concentric ring 116. This structure is configured to split the flow tangentially in two directions at the end of each of the radially symmetric branches 114a, 114b, 114c. The concentric ring 116 thereby connects each of the radially symmetric branches 114a, 114b, 114c into a single "stage" of the mixer 100. While the radially symmetrical channel structure 110 is shown including a single "stage" (i.e. branch and ring combination), additional stages may be included by radially extending the outlet branches 118a, 118b, 118c into another concentric ring similar to the concentric ring 116. Examples of multiple stage structures are described herein below.

As shown, after being split evenly at the end of each of the radially symmetric branches 114a, 114b, 114c at the concentric ring 116, the flow recombines at the inlet of the radially extending outlet branches 118a, 118b, 118c. This recombination point at the inlet of the radially extending outlet branches 118a, 118b, 118c promotes mixing via a colliding flowpoint. This combining point may create fluidic eddys or swirling or other turbulent flow, and otherwise promote diffusive transport of the fluid. Thus, at least a portion of the flow through each of the radially symmetric branches 114a, 114b, 114c is recombined with flow through the other radially symmetric branches 114a, 114b, 114c within the fluid channel of the concentric ring 116.

Rather than transporting fluid to another stage, in a single stage embodiment, the outlet branches 118a, 118b, 118c may recombine into a mixer outlet (not shown). Such a mixer outlet may be located about the same center axis as the inlet 112 but spaced apart from the inlet 112 axially. Like the combination point at the inlet of the radially extending the outlet branches 118a, 118b, 118c, the recombination of fluid at the mixer outlet may create fluidic turbulence, collision and/or promote mixing.

The parallel paths of the radially symmetric channel structure 110 may be configured to reduce the total hydraulic resistance of the mixer 100 and pressure drop of the mixer 100 relative to prior art bead mixers or other mixers. The more parallel paths for the fluid to take, however, the greater the overall volume of fluid allowable in the mixer at a given point in time, assuming the path volume does not change.

Further, in the mixers described herein including the mixer 100 may be configured such that when installed in a liquid chromatography system, such as the liquid chromatography system 10, the symmetry axis of the radially symmetrical channel structure 10 is alignable with the gravity vector of the radially symmetric channel structure 10. For example, in such a configuration, the mixer 100 may be aligned in a directly upright manner in which the inlet and outlet flow vertically while the stages extend horizontally from the vertically aligned inlet and outlet.

In practice, the volume flow rate of fluid at the inlet Q is split into three equal volume flow rates flowing through each of the three radially symmetric branches 114a, 114b, 114c each equal to Q/3. The volume flow rates of the three radially extending outlet branches 118a, 118b, 118c is likewise equal to Q/3. The radially extending the outlet branches 118a, 118b, 118c are not spaced equidistant between the ends of each of the radially symmetric branches 114a, 114b, 114c. Rather, each respective outlet branch 118a, 118b, 118c is located closer to one adjacent radially symmetric branch 114a, 114b, 114c and further from another. The longer and shorter flow paths created by the location of the three outlet branches 118a, 118b, 118c relative to the radially symmetric branches 114a, 114b, 114c promote mixing. As shown, an equal number of outlet branches 118a, 118b, 118c as inlet branches 114a, 114b, 114c to maintain radial symmetry.

Figure 3:
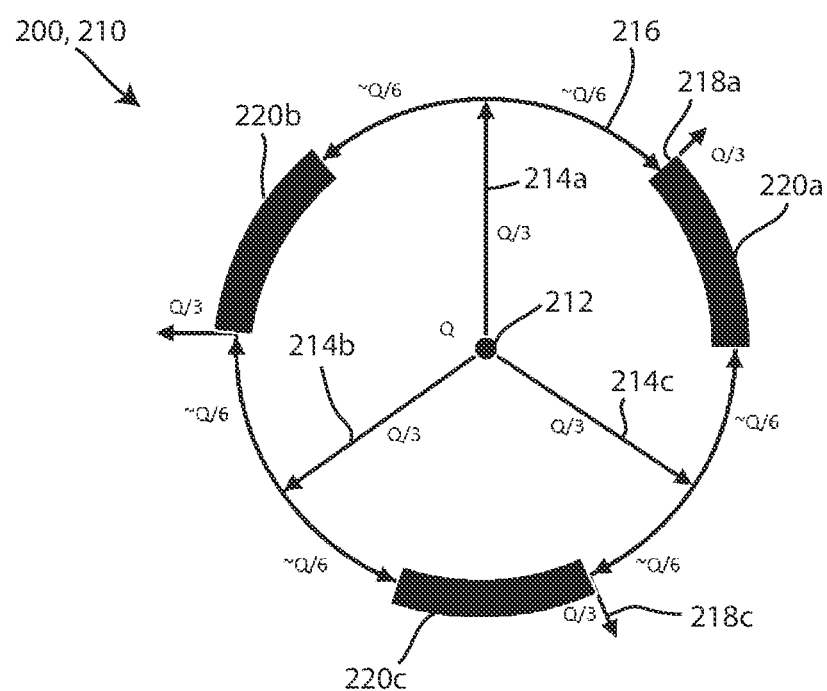
FIG. 3 depicts a schematic diagram of an embodiment of another mixer for a liquid chromatography system.

FIG. 3 depicts a schematic diagram of an embodiment of another mixer 200 for a liquid chromatography system, such as the liquid chromatography system 10, in accordance with one embodiment. As shown, the mixer 200 is similar to the mixer 100 in that the mixer 200 includes a radially symmetric channel structure 210 having an inlet 212 configured to receive a flow of fluid, a plurality of radially symmetric branches 214a, 214b, 214c extending radially outwardly from the inlet 212, a concentric ring 216 surrounding the radially symmetric branches 214a, 214b, 214c, and a plurality of outlet branches 218a, 218b, 218c extending radially outwardly from the concentric ring 216.

Unlike the mixer 100, the concentric ring 216 of the mixer 200 includes three volume offset regions 220a, 220b, 220c—one for each of the radially symmetric branches 214a, 214b, 214c. The volume offset regions 220a, 220b, 220c each extend from one side of the inlet of each the outlet branches 218a, 218b, 218c. Specifically, the volume offset region 220a is located proximate a clockwise facing side relative to the inlet of the outlet branch 218a. Similarly, the volume offset region 220b is located proximate a clockwise facing side relative to the inlet of the outlet branch 218b, and the volume offset region 220c is located proximate a clockwise facing side relative to the inlet of the outlet branch 218c.

The volume offset regions 220a, 220b, 220c may each include a larger volume per unit length along the concentric ring 216 than the narrower channel portions of the concentric ring 216. The volume offset regions 220a, 220b, 220c may thus be configured to delay fluid propagation by a time required by the flow to pass through the volume of the respective region 220a, 220b, 220c. The volumes within each of the volume offset regions 220a, 220b, 220c may be the same, and may particularly be tailored or optimized to target a stroke volume of a pump located upstream from the mixer 200 within a liquid chromatography system, such as the pump 12 of the liquid chromatography system 10. For example, the volumes within each of the volume offset regions 220a, 220b, 220c may be particularly be tailored to target a full stroke volume of an upstream pump. In one embodiment, the total volume offset of the mixer 200, or a stage of the mixer thereof, would be equal to 25% of the full-stroke volume of the upstream pump. Thus, if the pump stroke volume was equal to V, the entirety of the volume offset of the mixer 200 as shown may be V/4.

When the fluid enters the mixer 200, the volume flow rate of fluid at the inlet Q is split into three equal volume flow rates flowing through each of the three radially symmetric branches 214a, 214b, 214c each equal to Q/3. The volume flow rates of the three radially extending outlet branches 218a, 218b, 218c is likewise equal to Q/3. Between these branches, the flow through the concentric circle 216 is approximately equal to Q/6 after being split at the end of each of the three radially symmetric branches 214a, 214b, 214c. It should be understood that in some embodiments, the volume flow rate of Q/6 may be slightly different than Q/6 due to small differences in hydraulic resistance between the branches. Like the previous embodiment, the radially extending outlet branches 218a, 218b, 218c are not spaced equidistant between the ends of each of the radially symmetric branches 214a, 214b, 214c. Rather, each respective outlet branch 218a, 218b, 218c is located closer to one adjacent radially symmetric branch 214a, 214b, 214c and further from another. The difference in the time within each flow path after splitting at the concentric circle 216 is also made even larger by the volume offset regions 220a, 220b, 220c.

Like the mixer 100, the outlet branches 218a, 218b, 218c may recombine into an outlet that is located at an outlet (not shown). Such an outlet may be located about the same center axis as the inlet 212 but spaced apart from the inlet 212 axially. Like the combination point at the inlet of the radially extending the outlet branches 218a, 218b, 218c, the recombination of fluid at the outlet may create fluidic turbulence and promote mixing.

Figure 4:
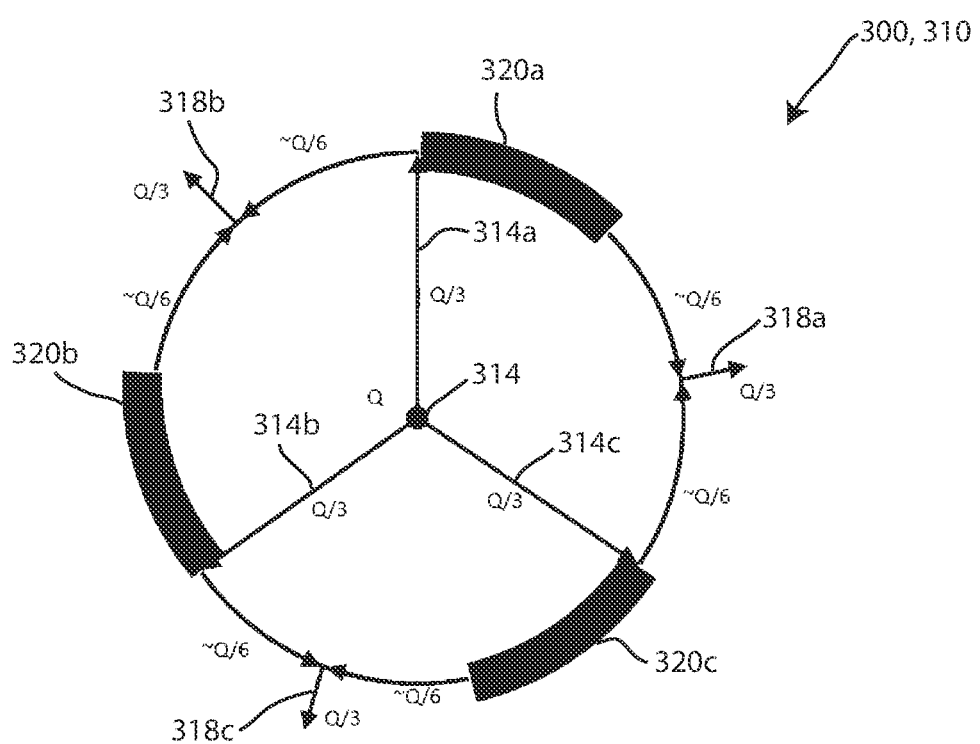
FIG. 4 depicts a schematic diagram of an embodiment of another mixer for a liquid chromatography system.

FIG. 4 depicts a schematic diagram of an embodiment of another mixer for a liquid chromatography system, such as the liquid chromatography system 10, in accordance with one embodiment. As shown, the mixer 300 is similar to the mixers 100, 200 in that the mixer 300 includes a radially symmetric channel structure 310 having an inlet 312 configured to receive a flow of fluid, a plurality of radially symmetric branches 314a, 314b, 314c extending radially outwardly from the inlet 312, a concentric ring 316 surrounding the radially symmetric branches 314a, 314b, 314c, and a plurality of outlet branches 318a, 318b, 318c extending radially outwardly from the concentric ring 316.

Similar to the mixer 200, the mixer 300 includes volume offset regions 320a, 320b, 320c. However, unlike the mixer 200, the volume offset regions 320a, 320b, 320c are located at the outlet of each of the radially symmetric branches 314a, 314b, 314c. Specifically, the volume offset regions 320a, 320b, 320c are located proximate a clockwise facing side relative to the outlet of where each of the radially symmetric branches 314a, 314b, 314c meets the concentric ring 316. Functionally, the mixer 300 may operate in the same or a similar manner to the mixer 200. The mixer 300 displays that the location of the volume offset regions in the concentric ring can be moved without departing from the scope of the invention. In still other embodiments, the volume offset regions may be located closer to a midpoint between the outlet of the radially symmetric 314a, 314b, 314c and the inlet of the outlet branches 318a, 318b, 318c.

Figure 5:
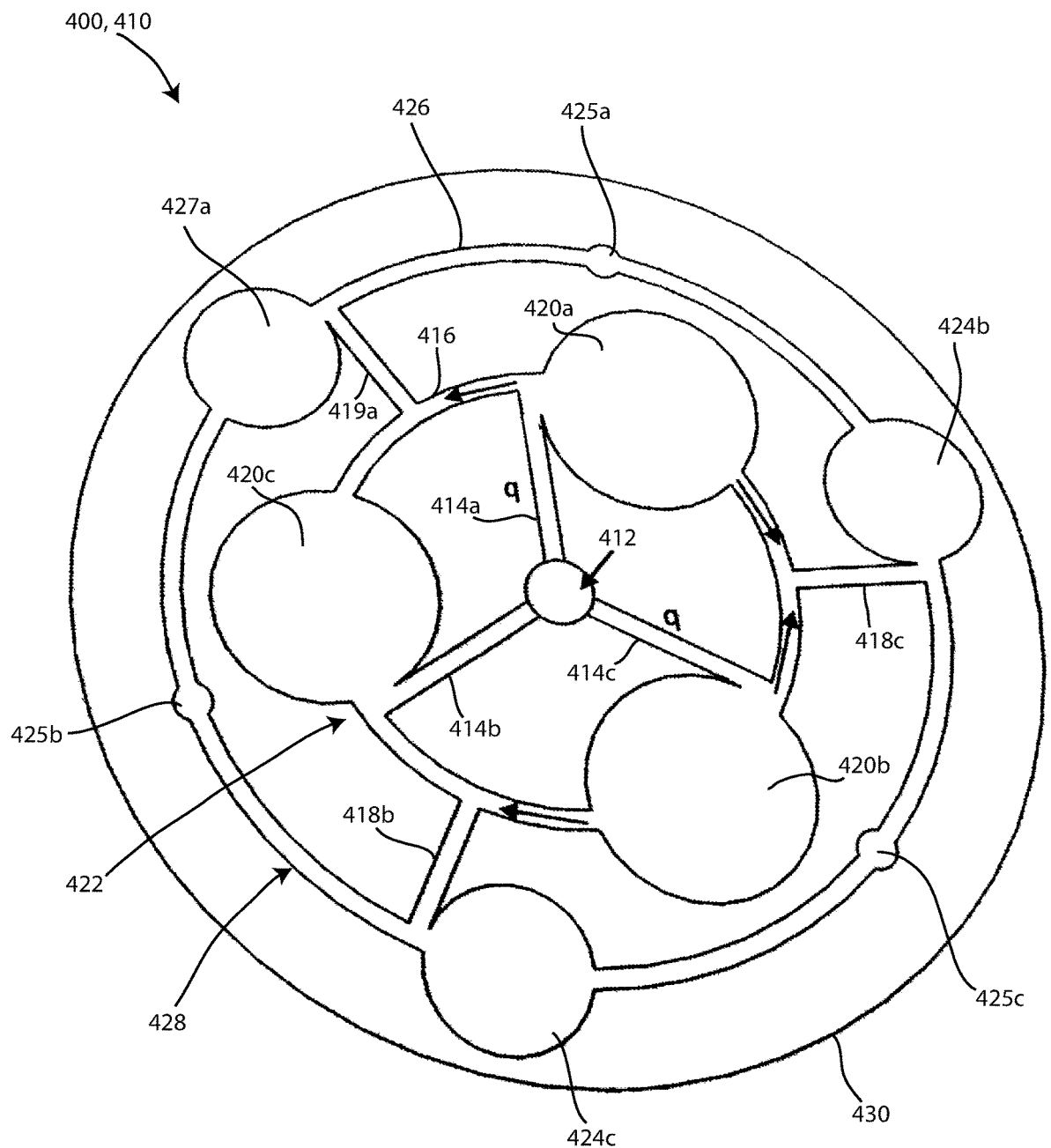
FIG. 5 depicts a schematic diagram of an embodiment of another mixer for a liquid chromatography system.

FIG. 5 depicts a schematic diagram of an embodiment of another mixer 400 for a liquid chromatography system, such as the liquid chromatography system 10, in accordance with one embodiment. The mixer 400 includes a mixer body 430 surrounding a channel structure. As shown, the mixer 400 is similar to the mixers 100, 200, 300 in that the mixer 400 includes a radially symmetric channel structure 410 having an inlet 412 configured to receive a flow of fluid, a plurality of radially symmetric branches 414a, 414b, 414c extending radially outwardly from the inlet 412, a concentric ring 416 surrounding the radially symmetric branches 414a, 414b, 414c, and a plurality of outlet branches 418a, 418b, 418c extending radially outwardly from the concentric ring 416.

Furthermore, similar to the mixers 200, 300, the mixer 400 includes volume offset regions 420a, 420b, 420c. Like the mixer 300, the volume offset regions 420a, 420b, 420c are located at a clockwise side at the outlet of each of the radially symmetric branches 414a, 414b, 414c. However, unlike the mixer 300, the volume offset regions 420a, 420b, 420c are shown to be circumferential chambers, rather than widened elongated chambers. Any dimensional form of an offset region is contemplated such as a widened channel, a widened chamber, a spherical chamber, a cylindrical chamber, or any other shaped volumetric shape having a larger cross sectional area than the rest of the circumferential ring 416. In some embodiments, a serpentine channel may be used as an offset region. It may be desirable to include offset regions having lower dispersions, so a longer serpentine style channel may reduce dispersion relative to a large reservoir style channel. Further, the volume offset regions herein may be characterized as having a lower hydraulic resistance than the rest of the fluidic path.

Unlike the mixers 200, 300, the mixer 400 includes both a first concentric stage 422 and a second concentric stage 428. The first concentric stage 422 includes the plurality of radially symmetric branches 414a, 414b, 414c and the first concentric ring 416. The second concentric stage 428 includes the plurality of outlet branches 418a, 418b, 418c and a second concentric ring 426. Like the first concentric ring 416 of the first concentric stage 422, the second concentric ring 426 of the second concentric stage 422 includes volume offset regions 424a, 424b, 424c. The volume offset regions are located at the counterclockwise side of the outlet of each of the outlet branches 418a, 418b, 418c. Like the volume offset regions 420a, 420b, 420c, the volume offset regions 424a, 424b, 424c are circumferential chambers. Three outlets 425a, 425b, 425c are located roughly midway between each of the volume offset regions 424a, 424b, 424c about the second concentric ring 426. These outlets 425a, 425b, 425c may recombine at the mixer outlet (not shown). Such a mixer outlet may be located about the same center axis as the inlet 412 but spaced apart from the inlet 412 axially.

Figure 6:
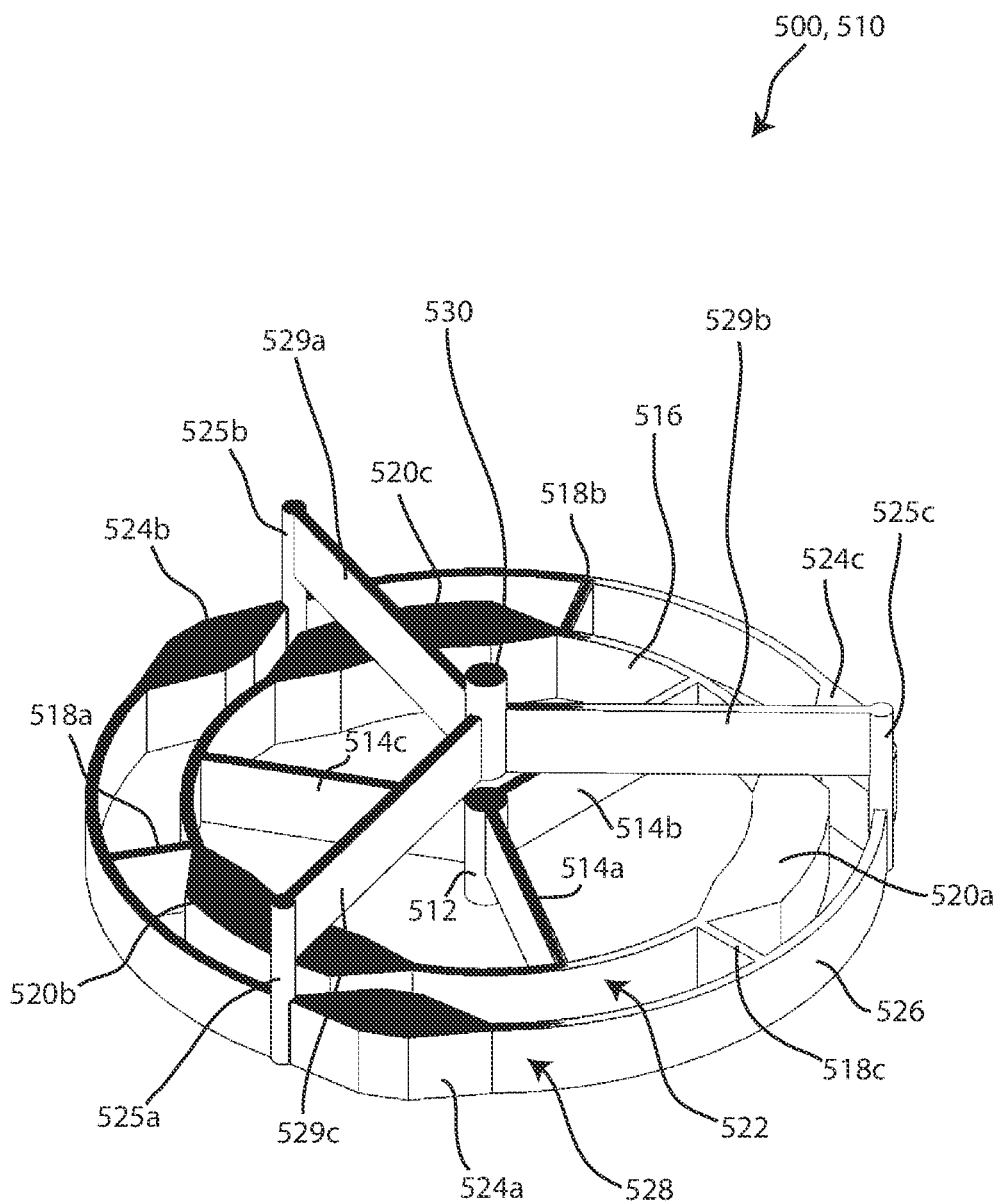
FIG. 6 depicts a perspective view of an embodiment of another mixer for a liquid chromatography system.

FIG. 6 depicts a perspective view of an embodiment of another mixer 500 for a liquid chromatography system, such as the liquid chromatography system 10, in accordance with one embodiment. Functionally, the mixer 500 may operate in a similar manner to the mixer 400 described herein above and shown schematically in FIG. 5. Thus, the mixer 500 is a two stage mixer in a single plane. The mixer 500 includes a radially symmetric channel structure 510 that includes a first stage 522 having an inlet 512 configured to receive a flow of fluid, a plurality of radially symmetric branches 514a, 514b, 514c extending radially outwardly from the inlet 512, a first concentric ring 516 surrounding the radially symmetric branches 514a, 514b, 514c. The mixer 500 includes a second stage 528 having a plurality of outlet branches 518a, 518b, 518c extending radially outwardly from the first concentric ring 516, and a second concentric ring 526 that is an outer ring relative to the first concentric ring 516. The first concentric ring 516 includes three volume offset regions 520a, 520b, 520c, each located on a counterclockwise side of the inlet to each of the plurality of outlet branches 518a, 518b, 518c. Similarly, the second concentric ring 526 includes three volume offset regions 520a, 520b, 520c, each located on a counterclockwise side of axial outlet channels 525a, 525b, 525c. The axial outlet channels 525a, 525b, 525c bring the fluid to a different plane that is located axially spaced from the first and second stages 522, 528. Each of the axial outlet channels 525a, 525b, 525c extends vertically to transport fluid to a respective radial outlet branch 529a, 529b, 529c that is spaced axially apart from the first and second stages 522, 528. The radial outlet branches 529a, 529b, 529c recombine at a mixer outlet 530 whereby turbulence at the recombination point may further facilitate mixing.

Figure 7:
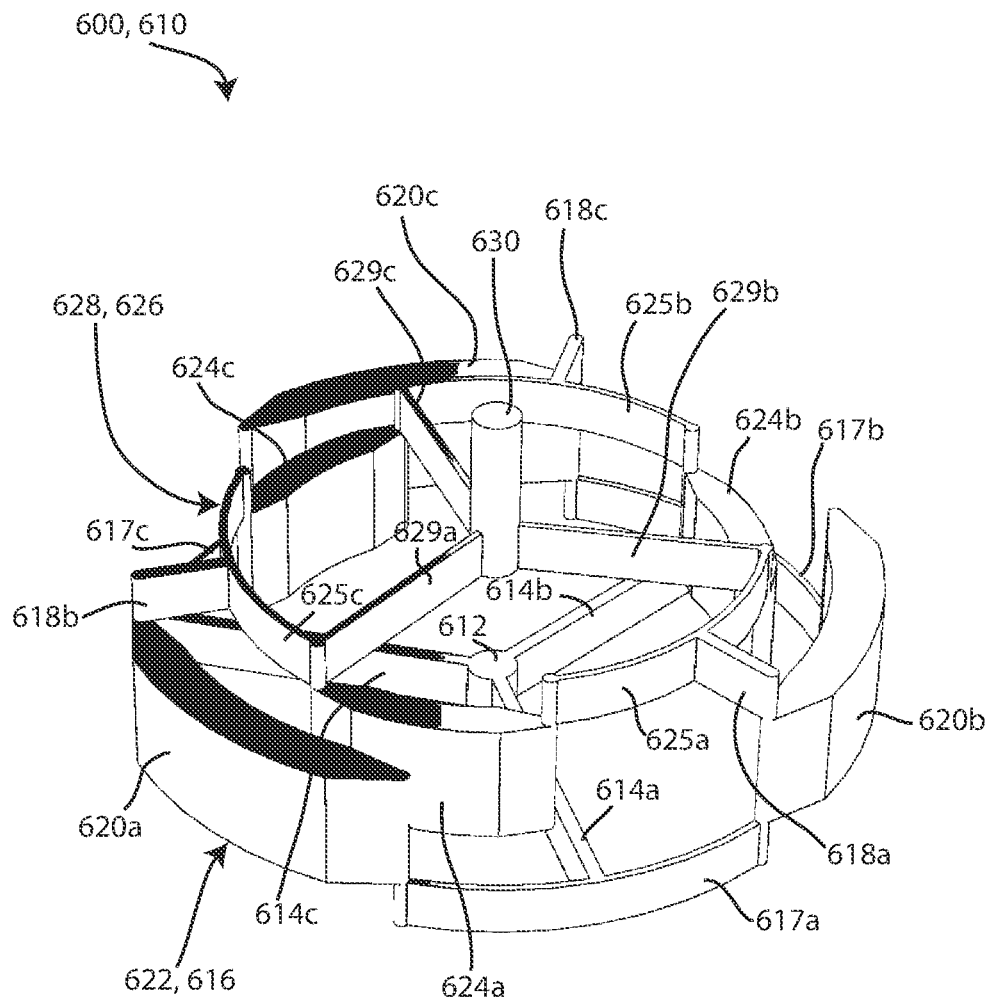
FIG. 7 depicts a perspective view of an embodiment of another mixer for a liquid chromatography system.

FIG. 7 depicts a perspective view of an embodiment of another mixer 600 for a liquid chromatography system, such as the liquid chromatography system 10, in accordance with one embodiment. Unlike the mixer 500, the mixer 600 is shown where the restrictive channels are on separate planes from the volume offset regions. Like the mixer 500, the mixer 600 is a two stage mixer. However, the mixer 600 is functionally operative on different planes. In particular, the mixer 600 includes two stages spread across three planes. The mixer 600 includes a radially symmetric channel structure 610 that includes a first stage 622 having an inlet 612 configured to receive a flow of fluid, a plurality of radially symmetric branches 614a, 614b, 614c extending radially outwardly from the inlet 612. The radially symmetric branches 614a, 614b, 614c in the mixer 600 extend radially to an outer concentric ring 616, making the first stage 622 of the mixer 600 correspond with the outer ring, unlike the embodiments described herein above.

The radially symmetric branches 614a, 614b, 614c each extend to a respective flow restrictor channel 617a, 617b, 617c. The flow restrictor channels 617a, 617b, 617c may include a higher hydraulic resistance, and may be configured to define the hydraulic resistance of the mixer 600. The flow restrictor channels 617a, 617b, 617c are shown extending to volume offset regions 620a, 620b, 620c located on each side of the flow restrictor channels 617a, 617b, 617c. The volume offset regions 620a, 620b, 620c are axially spaced apart and in a separate plane from the flow restrictor channels 617a, 617b, 617c.

Extending from one end of each of the volume offset regions 620a, 620b, 620c is a radially extending branch 618a, 618b, 618c which extends radially inwardly to a second stage 628 and second concentric ring 626 of the mixer 600. The radially extending branches 618a, 618b, 618c each extend to a respective flow restrictor channel 625a, 625b, 625c which act in a similar manner as the flow restrictor channels 617a, 617b, 617c and may include the same hydraulic resistance as the flow restrictor channels 617a, 617b, 617c. In other embodiments it may be desirable that each stage is dominated by a different hydraulic resistance, which could be accomplished by flow restrictor channels in different stages having different dimensions.

Like the first stage 622, the flow restrictor channels 625a, 625b, 625c are shown extending to volume offset regions 624a, 624b, 624c located on each side of the flow restrictor channels 625a, 625b, 625c. Notably, the volume offset regions 624a, 624b, 624c are located in the same axial plane as the volume offset regions 620a, 620b, 620c. Still further, radial outlet branches 629a, 629b, 629c extend radially inwardly from one side of each of the flow restrictor channels 625a, 625b, 625c. The radial outlet branches 629a,

629b, 629c recombine at a mixer outlet 530 whereby turbulence at the recombination point may further facilitate mixing.

As can be plainly seen from the embodiments described hereinabove, various embodiments of radially symmetric mixers are contemplated including any number of stages. The mixers contemplated herein may constitute any number of planes in any configuration. Further, while many of the embodiments described herein include three radially extending branches for each stage, the radially symmetric mixers may include any number of branches, volume offset regions, and/or restrictor channels per mixer and/or stage. Still further, while channels are shown in the mixers 500, 600 as having an elongated cross section, any cross sectional area or shape is contemplated for any of the branches, volume offset regions, restrictor channels, concentric rings or the like described herein.

Methods of mixing fluid in a chromatography system, such as the liquid chromatography system 10, are also contemplated herein. Methods contemplated herein include providing a fluid, by at least one fluidic pump, such as the pump 12, to a mixer, such as one of the mixers 100, 200, 300, 400, 500, 600 described herein. Methods include receiving the fluid by an inlet, such as one of the inlets 112, 212, 312, 412, 512, 612, and distributing the received fluid through a radially symmetric channel structure, such as one of the channel structures 110, 210, 310, 410, 510, 610, located downstream from the inlet. Methods include splitting flow of the fluid through the radially symmetric channel structure into a first plurality of radially symmetric branches, such as one of the sets of branches 114, 214, 314, 414, 514, 614.

Methods may further include splitting flow of the fluid tangentially in two directions at the end of each of the first plurality of radially symmetric branches, for example into a counterclockwise and clockwise flow through a concentric ring, such as one of the concentric rings 116, 216, 316, 416, 516, 616, that connects each of the radially symmetric branches. Methods may include recombining the flow through each of the first plurality of radially symmetric branches with another of the radially symmetric branches within the concentric ring fluid channel.

In accordance with some embodiments of methods herein, each of the first plurality of radially symmetric branches and the concentric ring comprises a first concentric stage and wherein the radially symmetric channel structure further includes a second concentric stage extending in a radial direction from the first concentric stage, wherein the second concentric stage includes a second ring and a second plurality of radially symmetric branches. Methods contemplated include flowing the fluid through each of the first concentric stage and then through the second concentric stage.

Methods contemplated may further include offsetting the flow of the fluid through the concentric ring with at least one volume offset region for each of the first plurality of radially symmetric branches. Methods may further include optimizing the volume offset regions based on a stroke volume of the at least one pump. For example, methods further include targeting a full stroke volume of the at least one fluidic pump with a volume offset located within the first concentric stage, such as with one of the sets of volume offset regions 220, 320, 420, 520, 620. Methods may also include, targeting a half stroke volume of the at least one fluidic pump with a second volume offset located within the second concentric stage, such as with one of the sets of volume offset regions 424, 524, 624. Still further, methods may include aligning the symmetry axis of the radially symmetric channel structure with the gravity vector of the radially symmetric channel structure.

Figure 8:
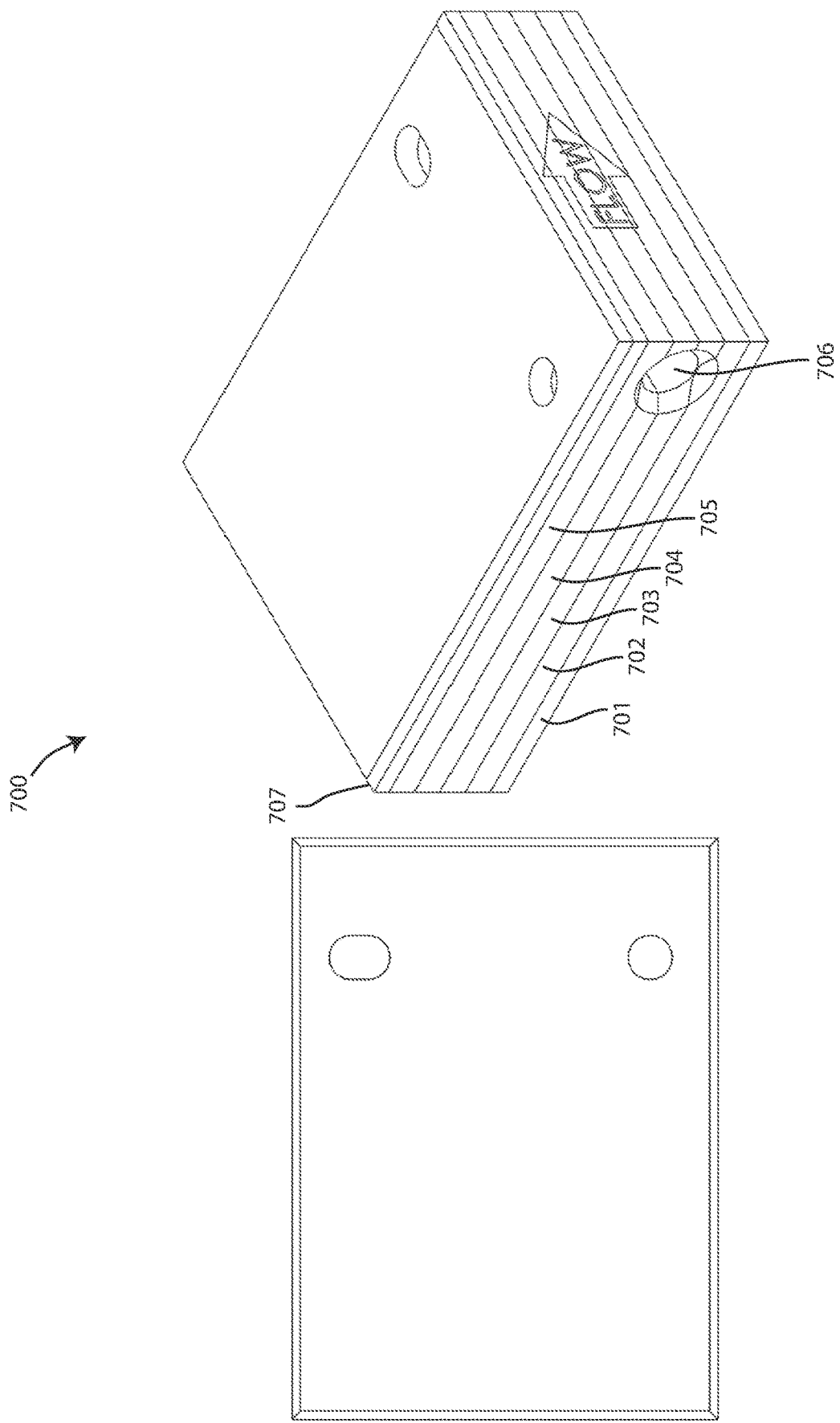
FIG. 8 depicts a perspective view of another embodiment of a mixer for a liquid chromatography system.

Referring now to FIGS. 8-13B, another embodiment of a continuous flow mixer 700 is shown which utilizes symmetry in the form of axial symmetry. Referring firstly to FIG. 8, a perspective view of another embodiment of the mixer 700 for a liquid chromatography system, such as the liquid chromatography system 10 described hereinabove. The continuous flow mixer 700 includes a layered structure that includes a first layer 701, a second layer 702, a third layer 703, a fourth layer 704, and a fifth layer 705. Each of the layers 701, 702, 703, 704, 705 represents a mixing stage or a functional layer of the mixer 700. While the embodiment shown includes a single mixing stage per layer, other embodiments contemplated may include more than one mixing stage per layer, where each mixing stage includes a different offset volume for targeting a different compositional frequency oscillation. In still other embodiments, a single mixing stage may span across multiple layers. The continuous flow mixer 700 further includes a mixer inlet 706 configured to receive an inlet flow of fluid into the mixer 700, from for example, an upstream pump such as the pump 12 of the liquid chromatography system 10, shown in FIG. 1. The mixer inlet 706 may provide the fluid to the first stage of the mixer, which is located within the first layer 701 as shown. The mixer 700 may be a micromachined chip having microchannels engraved into the various layers 701, 702, 703, 704, 705 in the manner shown. The layers, when stacked together, form the fluidic channels and flow paths described herein. A top layer 707 may be an upper wall or surface that is configured to enclose the topmost layer 705 of the various functional layers 701, 702, 703, 704, 705. While not shown in FIG. 8, a mixer outlet 708 (shown in FIG. 11B) is located on an opposite side of the mixer 700 as the mixer inlet 706.

Figure 9B:
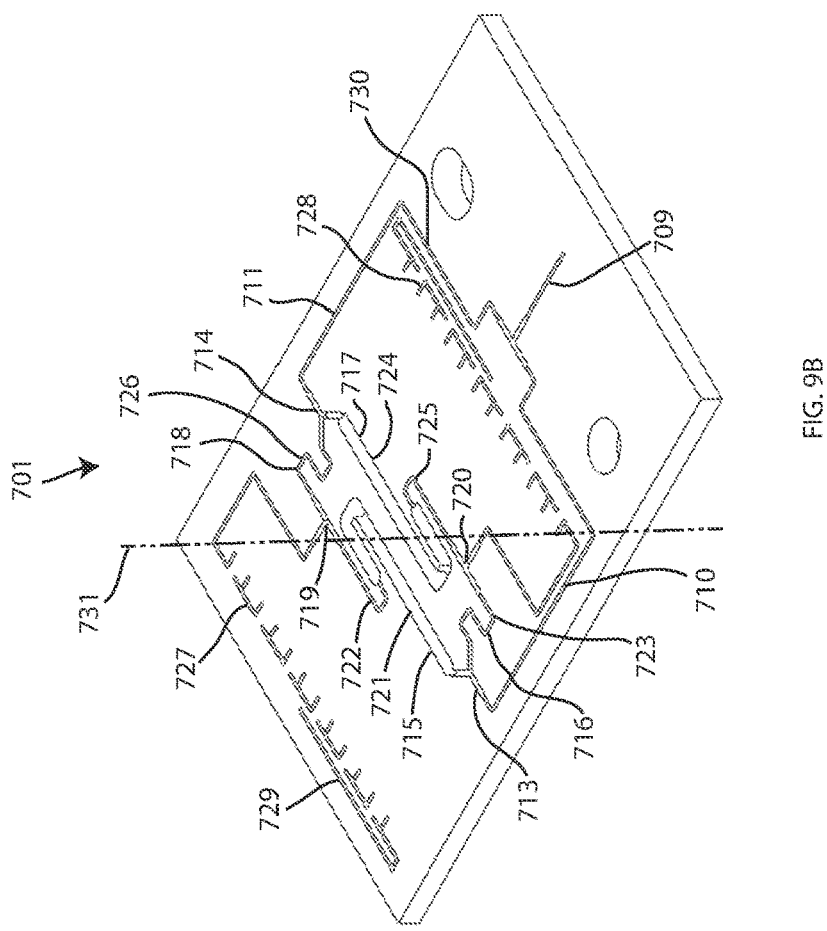
FIG. 9B depicts a perspective view of the first layer of FIG. 9A.
Figure 9A:
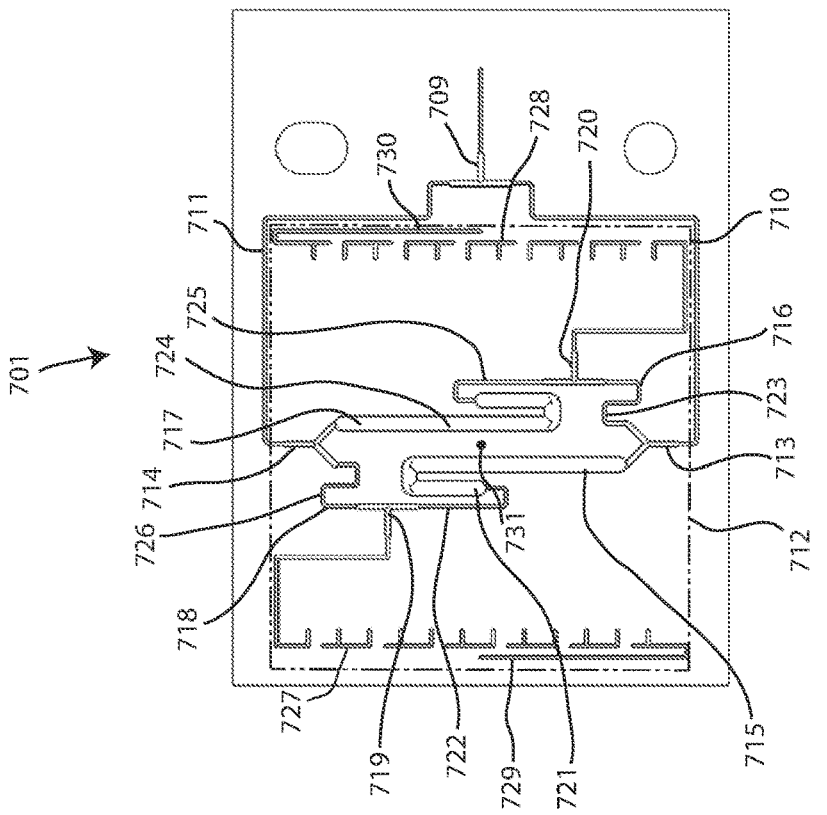
FIG. 9A depicts a top view of a first layer of the mixer of FIG. 8.

FIG. 9A depicts a top view of the first layer 701 of the mixer 700 of FIG. 8 and FIG. 9B depicts a perspective view of the first layer 701 of FIG. 9A. As shown, mixer inlet 706 delivers fluid into the first layer 701 at a first layer inlet 709. The first layer inlet 709 splits the flow of received fluid into two separate branches via a T-shaped splitting intersection. The two separate channels the flow is split into includes a first inlet branch 710 and a second inlet branch 711. The first and second inlet branches 710, 711 may each receive fluid from the first layer inlet 709 such that the fluid flows through each of the first and second inlet branches 710, 711 at the same volumetric flow rate. The first and second inlet branches 710, 711 provide fluid to a first channel structure 712 located downstream from the first and second inlet branches 710, 711. The channel structure 712 is thus located between the mixer inlet 706 and the mixer outlet 708 and is utilized to mix the fluid within the mixer 700 in the manner described hereinbelow. While the mixer 700 described herein includes five separate channel structures, one located in each of the five functional layers 701, 702, 703, 704, 705, it should be understood that more or less axially symmetric channel structures are contemplated depending on the mixing requirements, total volume requirements of the mixer, and the like.

The first channel structure 712 includes a first splitter 713 located downstream from the first inlet branch 710, and a second splitter 714 located downstream from the second inlet branch 711. The first and second splitters 713, 714 are shown to include Y-shaped intersections which each split the flow of fluid from the respective first and second inlet branches 710, 711 into two separate branches. The first splitter 713 splits the flow into a first plurality of branches 715, 716 extending from the first splitter 713. Similarly, the second splitter 714 splits the flow into a second plurality of branches 717, 718 extending from the second splitter 714.

The channel structure 712 includes a first outlet branch 719 and a second outlet branch 720. The first and second outlet branches 719, 720 are shown to include T-shaped intersections which combine the flow of fluid from the two separate incoming branches into a single outlet flow. Each branch of the first plurality of branches 715, 716 is connected to a different of the outlet branches 719, 720. Similarly, each branch of the second plurality of branches 717, 718 is also connected to a different of the outlet branches 719, 720. In particular, a first branch 715 of the first plurality of branches 715, 716 is connected to the first outlet branch 719, while a second branch 716 of the first plurality of branches 715, 716 is connected to the second outlet branch 720. Similarly, a third branch 717 of the second plurality of branches 717, 718 is connected to the second outlet branch 720, while a fourth branch 718 of the second plurality of branches 717, 718 is connected to the first outlet 719 branch.

The first branch 715 of the first plurality of branches 715, 716 includes a greater volume region 721 and a flow restrictor region 722, while the second branch 716 includes a flow restrictor region 723 without a greater volume region like the greater volume region 721. The flow restriction regions 722, 723 of each of the first and second branches 715, 716 may include the same geometry (i.e. cross sectional dimensions and shape) and flow restriction such that flow rate of fluid is the same, nearly the same, or substantially equivalent through each of the first branch 715 and the second branch 716.

Similarly, the third branch 717 of the second plurality of branches 717, 718 includes a greater volume region 724 and a flow restrictor region 725, while the fourth branch 718 includes a flow restrictor region 726 without a greater volume region like the greater volume region 724. The flow restriction regions 725, 726 of each of the third and fourth branches 717, 718 may include the same geometry (i.e. cross sectional dimensions and shape) and flow restriction such that flow rate of fluid is the same, nearly equal, or substantially equivalent through each of the third branch 717 and the fourth branch 718.

The greater volume regions 721, 724 are each configured to create an offset in the residence time for fluid moving through the first and third branches 715, 717 relative to the second and third branches 716, 718. Thus, fluid coming to the first outlet branch 719 from the first branch 715 is delayed relative to the fluid coming to the first outlet branch 719 from the fourth branch 718, due to the longer residence time that the fluid takes in the greater volume region 721 of the first branch 715. Similarly, fluid coming to the second outlet branch 720 from the third branch 717 is delayed relative to the fluid coming to the second outlet branch 720 from the second branch 716, due to the longer residence time that the fluid takes in the greater volume region 724 of the third branch 717. In other words, because of the greater volume region 721, flow is functionally delayed through the first branch 715 and third branches 717 relative to the second and fourth branches 716, 718. Thus, fluid split at the first splitter 713 and going through the first branch 715 arrives at the first outlet branch 719 after fluid going through the second branch 716 arrives at the second outlet branch 720. Likewise, fluid split at the second splitter 714 and going through the third branch 717 arrives at the second outlet branch 720 after fluid going through the fourth branch 718 arrives at the first outlet branch 719.

The greater volume regions 721, 724 may thus be configured to provide a volume or residence time offset for the first and third channels 715, 717 relative to the volume of the second and fourth channels 716, 718. The volume or residence time offset of the greater volume regions 721, 724 may be sized to specifically target the noise frequencies of the pump 12 within the liquid chromatography system 10, such as the full stroke volumetric frequency, the half-stroke volumetric frequency and/or harmonic frequencies thereof. The volume offsets described herein may also be configured to address other noise or oscillation frequencies in fluidic compositions which may be discovered through empirical testing. These frequencies may or may not be caused by the pump or the pump stroke. However, the volume offset between the first and second channels 715, 716 and the third and fourth channels 717, 718 may be particularly engineered to mix fluid in a manner which reduces compositional oscillations in a liquid chromatography system, such as compositional oscillations resulting from the mechanical workings of the pump 12.

After the fluid is combined into the single outlets by intersections of the first and second outlet branches 719, 720, the fluid may thereafter be transported to respective flow dispersion channel structures 727, 728. In particular, a first flow dispersion channel structure 727 is located downstream from the first symmetric channel structure outlet 719, and a second flow dispersion channel structure 728 is located downstream from the second symmetric channel structure outlet 720. The first and second flow dispersion channel structures 727, 728 may each be located within the axially symmetric channel structure 712.

Figure 14:
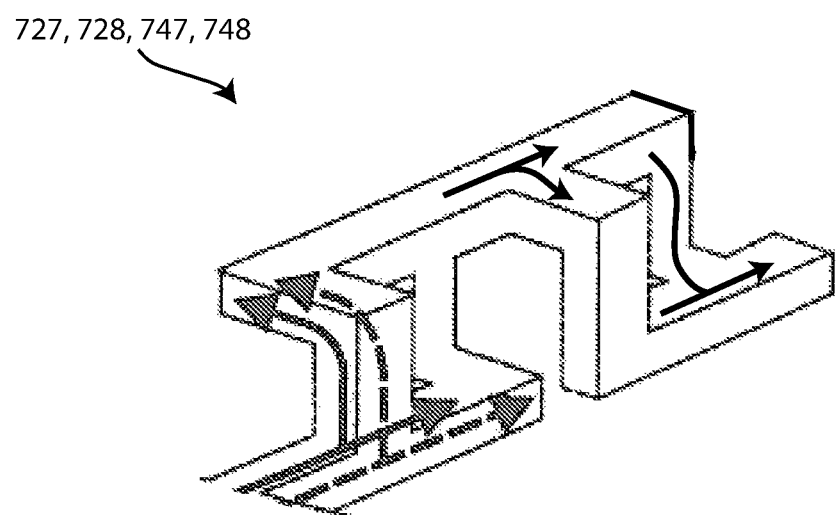
FIG. 14 depicts a portion of a flow dispersion channel structure in accordance with one embodiment.

FIG. 14 depicts a portion of a flow dispersion channel structure, such as the flow dispersion channel structures 727, 728 in accordance with one embodiment. The flow dispersion channel structure depicted in FIG. 14 includes a single iteration of the structure depicted in FIG. 14, whereby flow is split into two separate channels which then recombine. This pattern is repeated but with opposite chirality, resulting in splitting and re-laminating the flow resulting in highly-efficient mixing transverse to the flow direction especially if the pattern is repeated as shown. The split channels rotate and re-laminate the fluid, but the cross-sectional area of the channels is the same. Thus, the two channels do not meaningfully delay the fluid relative to each other, but the pathways created by the channels mix the fluid within the channel in the direction transverse to the flow, effectively blending the solvent streams that are being joined at 719 and 720. The flow dispersion channel structures 727, 728 may include many iterations in series of the portion of the structure shown in FIG. 14.

Downstream from each of the flow dispersion channel structures 727, 728 are respective first layer outlet channels 729, 730 for providing the fluid to the second layer 702 of the mixer 700. Thus, the first layer 701 is substantially axially symmetric about an axis 731 extending into and out of the page at the point shown. In particular, each of the elements found within the axially symmetric channel structure 712 are axially symmetric about the axis 731. The axially symmetry and the channel structure of the present invention shown in FIG. 9A has been found to be particularly advantageous in ensuring a good flow balance between the parallel branches of the mixing stage. Symmetry is configured to ensure that the flow is well-balanced between the parallel branch structures, while also providing a benefit to pressure drop and dispersion. For example, having two branches in parallel may provide one half the pressure drop relative to a non-parallel configuration. The parallel branches provide benefit to the mixing performance by reducing the pressure drop across the mixer and providing improved dispersion characteristics.

FIG. 10A depicts a top view of a second layer 702 of the mixer 700 of FIG. 8 and FIG. 10B depicts a perspective view of the second layer 702 of FIG. 10A stacked above the first layer of FIGS. 9A and 9B. As shown, the outlet channels 729, 730 deliver fluid into the second layer 702. The entirety of the second layer 702 is shown to be axially symmetric. Thus, the second layer includes an axially symmetric channel structure 732 that encompasses the entire channel structure of the second layer 702.

The axially symmetric channel structure 732 includes a first inlet branch 733 and a second inlet branch 734. Again, the first and second inlet branches 733, 734 receive fluid from the outlet channels 729, 730 of the first layer 701. The first and second symmetric channel structure inlets 733, 734 and are shown to include Y-shaped intersections which each split the flow of fluid into two separate branches. The first inlet branch 733 splits the flow into a first plurality of branches 735, 736 extending from the first inlet branch 733. Similarly, the second inlet branch 734 splits the flow into a second plurality of branches 737, 738 extending from the second inlet branch 734.

The axially symmetric channel structure 732 includes a first outlet branch 739 and a second outlet branch 740. The first and second outlet branches 739, 740 are shown to include T-shaped intersections which combine the flow of fluid from the two separate incoming branches into a single outlet flow. Each branch of the first plurality of branches 735, 736 is connected to a different of the outlet branches 739, 740. Similarly, each branch of the second plurality of branches 737, 738 is also connected to a different of the outlet branches 739, 740. In particular, a first branch 735 of the first plurality of branches 735, 736 is connected to the first outlet branch 739, while a second branch 736 of the first plurality of branches 735, 736 is connected to the second outlet branch 740. Similarly, a third branch 737 of the second plurality of branches 737, 738 is connected to the second outlet branch 740, while a fourth branch 738 of the second plurality of branches 737, 738 is connected to the first outlet branch 739.

The first branch 735 of the first plurality of branches 735, 736 includes a greater volume region 741 and a flow restrictor region 742, while the second branch 736 includes a flow restrictor region 743 without a greater volume region like the greater volume region 741. The flow restriction regions 742, 743 of each of the first and second branches 735, 736 may include the same geometry (i.e. cross sectional dimensions and shape) and flow restriction such that flow rate of fluid is the same, nearly the same, or substantially equivalent through each of the first branch 735 and the second branch 736.

Similarly, the third branch 737 of the second plurality of branches 737, 738 includes a greater volume region 744 and a flow restrictor region 745, while the fourth branch 738 includes a flow restrictor region 746 without a greater volume region like the greater volume region 744. The flow restriction regions 745, 746 of each of the third and fourth branches 737, 738 may include the same geometry (i.e. cross sectional dimensions and shape) and flow restriction such that flow rate of fluid is the same, nearly equal, or substantially equivalent through each of the third branch 737 and the fourth branch 738.

The greater volume regions 741, 744 are each configured to create an offset in the residence time for fluid moving through the first and third branches 735, 737 relative to the second and third branches 736, 738. Thus, fluid coming to the first outlet branch 739 from the first branch 735 is delayed relative to the fluid coming to the first outlet branch 739 from the fourth branch 738, due to the longer residence time that the fluid takes in the greater volume region 741 of the first branch 735. Similarly, fluid coming to the second outlet branch 740 from the third branch 737 is delayed relative to the fluid coming to the second outlet branch 740 from the second branch 736, due to the longer residence time that the fluid takes in the greater volume region 744 of the third branch 737. In other words, because of the greater volume region 741, flow is functionally delayed through the first branch 735 and third branches 737 relative to the second and fourth branches 736, 738. Thus, fluid split at the first splitter 733 and going through the first branch 735 arrives at the first outlet branch 739 after fluid going through the second branch 736 arrives at the second outlet branch 740. Likewise, fluid split at the second splitter 734 and going through the third branch 737 arrives at the second outlet branch 740 after fluid going through the fourth branch 738 arrives at the first outlet branch 739.

The greater volume regions 741, 744 may thus be configured to provide a volume or residence time offset for the first and third channels 735, 737 relative to the volume of the second and fourth channels 736, 738. The volume or residence time offset of the greater volume regions 741, 744 may be sized to specifically target the noise frequencies of the pump 12 within the liquid chromatography system 10, such as the full stroke volumetric frequency, the half-stroke volumetric frequency and/or harmonic frequencies thereof. The volume offsets described herein may also be configured to address other noise or oscillation frequencies in fluidic compositions which may be discovered through empirical testing. These frequencies may or may not be caused by the pump or the pump stroke. However, the volume offset between the first and second channels 735, 736 and the third and fourth channels 737, 738 may be particularly engineered to mix fluid in a manner which reduces compositional oscillations in a liquid chromatography system, such as compositional oscillations resulting from the mechanical workings of the pump 12.

The greater volume regions 741, 744 of the first and third branches 735, 737 of the second channel structure 732 of the second layer 702, while having the same volumes as each other, have a different volume than the greater volume regions 721, 724 of the first and third branches 715, 717 of the first channel structure 712 of the first layer 701. This may provide for the targeting of a different relevant frequency than the targeted frequency of the first layer 701 of the mixer 700.

After the fluid is combined into the single outlets by the first and second outlets 739, 740, the fluid may thereafter be transported to respective flow dispersion channel structures 747, 748. In particular, a first flow dispersion channel structure 747 is located downstream from the first symmetric channel structure outlet 739, and a second flow dispersion channel structure 748 is located downstream from the second symmetric channel structure outlet 740. The first and second flow dispersion channel structures 747, 748 may each include similar structure as the first and second flow dispersion channel structures 727, 728 described above and shown in FIG. 14. The purpose of these structures is to blend the flow streams in the direction transverse to the flow after the streams are combined at 739 and 740.

Downstream from each of the flow dispersion channel structures 747, 748 are respective first layer outlet channels 749, 750 for providing the fluid to the third layer 703 of the mixer 700. Thus, the second layer 702 is completely axially symmetric about the axis 731 extending into and out of the page at the point shown. The axis 731 is the same axis as that which is shown in FIG. 9A-9B, being that the first and second channel structures 712, 732 are aligned in a centered way about the axis 731. The axis 731 may be an axis of symmetry through each of the layers 701, 702, 703, 704, 705 in the embodiment shown. However, in other embodiments, each layer 701, 702, 703, 704, 705 may include a different axis of symmetry, if the layers are offset from each other. Referring back to FIGS. 10A-10B, each of the elements found within the channel structure 732 are axially symmetric about the axis 731.

It is important to note that the structure of the first layer 701 and the second layer 702 are rotated 90 degrees from each other. Thus, for example, the flow dispersion channel structures 747, 748 of the second layer 702 are located on the top and bottom sides of the second layer 702 while the flow dispersion channel structures 727, 728 of the first layer 701 are located on the right and left sides of the first layer 701. This alternating structure provides for a particularly advantageous multi-layer chip design which minimizes the non-functional channel volume, whereby the inlets of a first layer are located on alternating sides from the outlets relative to the inlets and outlets of the next layer. This allows for the outlets of a lower layer to immediately provide fluid to an inlet of the next layer.

Moreover, the layer 702 includes a drop-down channel 752 for delivering fluid from the mixer inlet 706 (and shown more particularly in the views of layer 703) to the first layer 702 and the first layer inlet 709 thereof.

FIG. 11A depicts a top view of the third layer 703 of the mixer 700 of FIG. 8 while FIG. 11B depicts a perspective view of the third layer 703 of FIG. 11A stacked above the first layer 701 of FIGS. 9A and 9B and the second layer 702 of FIGS. 10A and 10B. The third layer 703 may include substantially the same elements as the first two layers 701, 702. The third layer 703 includes a channel structure 765 that encompasses the entirety of the channel structure of the third layer 703. The third layer 703 is oriented in the same general orientation as the first layer 701, with the inlets of the layer at the top and bottom of the structure 765 and the outlets at the left and right side of the channel structure 765. The third layer 703 includes greater volume regions 762, 763 which are larger in volume than the previous greater volume regions 721, 724, 741, 744 of the first and second layers 701, 702. The difference in volume between the pathways provided by the greater volume regions 762, 763 may be configured to reduce or eliminate the compositional oscillations of a different frequency than the previous greater volume regions 721, 724, 741, 744.

The layer 703 is shown further including the mixer inlet 706 and the mixer outlet 708. The mixer inlet 706 is configured to provide inlet fluid to the drop-down channel 752 found in layer 702. The mixer outlet 708 is configured to be provided fluid from the top layer 705 after that fluid is combined and then output through a drop-down channel 774 shown in layer 704. Like the previous layers 701, 702, the channel structure 765 of the third layer 703 is axially symmetric about the axis of symmetry 731.

Figure 12B:
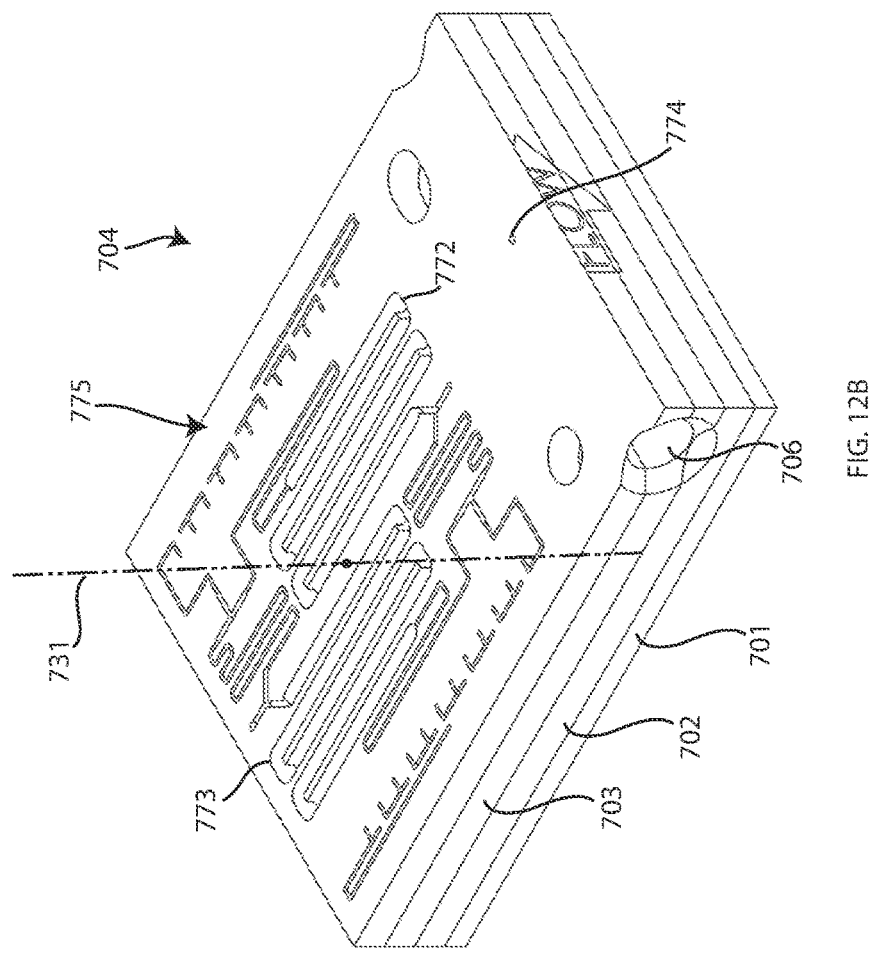
FIG. 12B depicts a perspective view of the fourth layer of FIG. 12A stacked above the first layer of FIGS. 9A and 9B, the second layer of FIGS. 10A and 10B, and the third layer of FIGS. 11A and 11B.
Figure 12A:
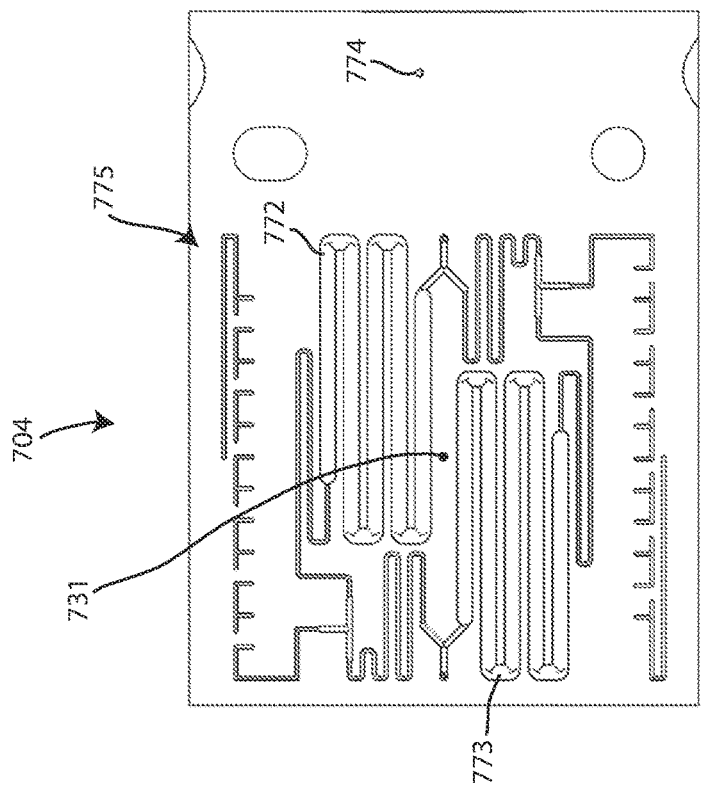
FIG. 12A depicts a top view of a fourth layer of the mixer of FIG. 8.

FIG. 12A depicts a top view of the fourth layer 704 of the mixer 700 of FIG. 8 while FIG. 12B depicts a perspective view of the fourth layer 704 of FIG. 12A stacked above the first layer 701 of FIGS. 9A and 9B, the second layer 702 of FIGS. 10A and 10B, and the third layer 703 of FIGS. 11A and 11B. Like the third layer, the fourth layer 704 may include substantially the same elements as the first three layers 701, 702, 703. The fourth layer 704 includes an axially symmetric channel structure 775 that encompasses the entirety of the channel structure of the fourth layer 704. The fourth layer 704 is oriented in the same general orientation as the second layer 702, with the inlets of the layer at the left and right sides of the axially symmetric channel structure 775 and the outlets at the top and bottom of the axially symmetric channel structure 775. The fourth layer 704 includes greater volume regions 772, 773 which are larger in volume than the previous greater volume regions 721, 724, 741, 744, 762, 763 of the first three layers 701, 702, 703. The difference in volume between the pathways provided by the greater volume regions 772, 773 may be configured to reduce or eliminate the compositional oscillations of a different frequency than the previous greater volume regions 721, 724, 741, 744, 762, 763. The fourth layer 704 further includes the drop-down channel 774 for carrying mixed fluid from the fifth layer 705 to the outlet 708 of the mixer 700. Like the previous layers 701, 702, 703, the channel structure 775 of the fourth layer 704 is axially symmetric about the axis of symmetry 731.

Figure 13B:
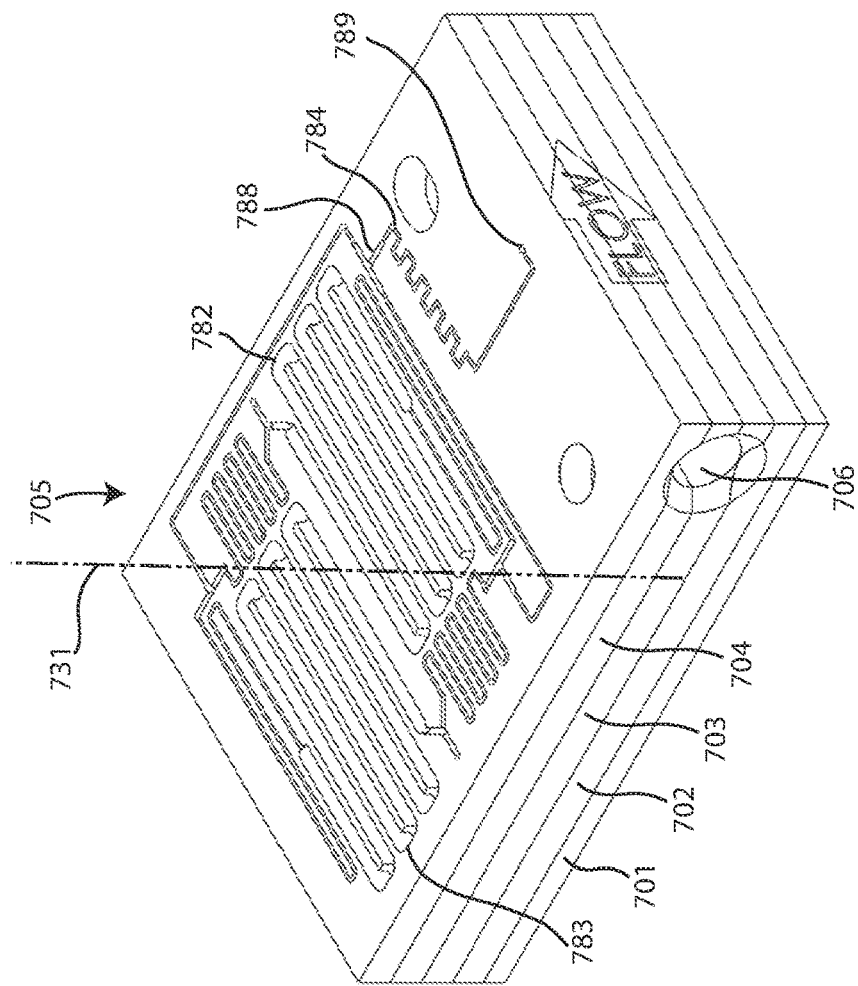
FIG. 13B depicts a perspective view of the fifth layer of FIG. 13A stacked above the first layer of FIGS. 9A and 9B, the second layer of FIGS. 10A and 10B, the third layer of FIGS. 11A and 11B, and the fourth layer of FIGS. 12A and 12B.
Figure 13A:
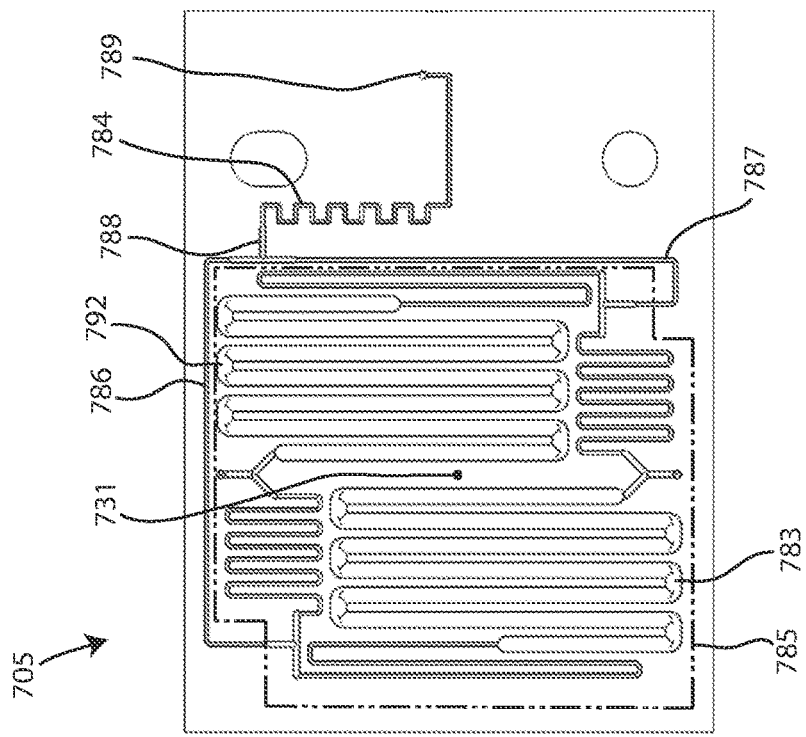
FIG. 13A depicts a top view of a fifth layer of the mixer of FIG. 8.

FIG. 13A depicts a top view of the fifth layer 705 of the mixer 700 of FIG. 8 while FIG. 13B depicts a perspective view of the fifth layer of FIG. 13A stacked above the first layer of FIGS. 9A and 9B, the second layer of FIGS. 10A and 10B, the third layer of FIGS. 11A and 11B, and the fourth layer of FIGS. 12A and 12B. The fifth layer 705 may include substantially the same elements as the first four layers 701, 702, 703, 704. The fifth layer 705 includes an axially symmetric channel structure 785 that encompasses the entirety of the channel structure of the fourth layer 704 other than outlets 786 and 787, along with a final recombination point 788, a final flow dispersion structure 784 and a final drop-down channel 789. The fifth layer 705 is oriented in the same general orientation as the first and third layers 701, 703, with the inlets of the layer at the top and bottom of the axially symmetric channel structure 785 and the outlets at the left and right sides of the axially symmetric channel structure 785. The fifth layer 705 includes greater volume regions 782, 783 which are larger in volume than the previous greater volume regions 721, 724, 741, 744, 762, 763, 772, 773 of the first four layers 701, 702, 703, 704. The difference in volume between the pathways provided by the greater volume regions 782, 783 may be configured to reduce or eliminate the compositional oscillations of a different frequency than the previous greater volume regions 721, 724, 741, 744, 762, 763, 772, 773. The fifth layer 705 further includes the drop-down channel 774 for carrying mixed fluid from the fifth layer 705 to the outlet 708 of the mixer 700. While the volumes of the greater volume regions 721, 724, 741, 744, 762, 763, 772, 773, 782, 783 are shown going in order from smallest to largest as the stages increase through the mixer, this is an exemplary embodiment and the volumes could go from largest to smallest or any other order. Like the previous layers 701, 702, 703, 704, the channel structure 785 of the fourth layer 705 is axially symmetric about the axis of symmetry 731.

The mixer 700 may be similar to the mixers 100, 200, 300, 400, 500, 600 described hereinabove. For example, like the mixer 700, the mixer 100 includes a plurality of symmetric channel structure inlets, such as the inlets 114a, 114b, 114c to the concentric ring 116. The mixer 100 includes a plurality of symmetric channel structure outlets, such as the outlets 118a, 118b, 118c configured to deliver the fluid to another stage. The concentric ring 116 may constitute branches of the mixer 100. In other words, when the fluid is received from each of the inlets 114a, 114b, 114c the concentric ring provides two branches for each of the inlet flow to break into. As described above, this branched flow may include a constant flow rate whereby the flow rate of fluid in one direction is equal to the flow rate of fluid in the other.

Methods of mixing fluid of a liquid chromatography system are also contemplated.

Methods include providing a fluid, by at least one fluidic pump such as the pump 12, to a mixer, such as one of the mixers 100, 200, 300, 400, 500, 600, 700. The method includes receiving the fluid by a mixer inlet of the mixer, such as the mixer inlet 706. The method includes distributing the received fluid through a radially or axially symmetric channel structure located downstream from the inlet, the radially or axially symmetric channel structure including a first stage, such as the first layer 701, that includes a plurality of symmetric channel structure inlets, such as the symmetric channel structure inlets 719, 720, 739, 740, and a plurality of symmetric channel structure outlets, such as the plurality of channel structure outlets 729, 730, 749, 750, and a plurality of branches located between the plurality of symmetric channel structure inlets and the plurality of symmetric channel structure outlets, such as the branches 715, 716, 717, 718, 735, 736, 737, 738, such that any given portion of the received fluid flows through only one of the plurality of symmetric channel structure inlets and only one of the plurality of symmetric channel structure outlets. The method may further include providing an outlet flow of the fluid from the continuous flow mixer. Still further, the method may include delaying a portion of the received fluid by at least one of the plurality of branches, such as the branch 715, relative to at least one other of the plurality of branches, such as the branch 716.

While the invention has been shown and described with reference to specific embodiments, it should be understood by those skilled in the art that various changes in form and detail may be made therein without departing from the spirit and scope of the invention as recited in the accompanying claims.

What is claimed is:

1. A fluid chromatography system comprising:
   at least one solvent reservoir;
   at least one pump connected to the at least one solvent reservoir configured to pump a flow of solvent from the at least one solvent reservoir downstream; and
   a continuous flow mixer downstream from the at least one pump, the mixer including:
      a mixer inlet configured to receive an inlet flow of fluid;
      a mixer outlet configured to provide an outlet flow of the fluid; and
      a first channel structure located between the mixer inlet and the mixer outlet, the first channel structure including:
      a first inlet branch;
      a second inlet branch;
      a plurality of outlet branches including at least a first outlet branch and a second outlet branch;
      a first plurality of branches splitting from the first inlet branch, each branch of the first plurality of branches connected to a different of the plurality of outlet branches; and
      a second plurality of branches splitting from the second inlet branch, each branch of the second plurality of branches connected to a different of the plurality of outlet branches,
      wherein at least two branches of the first and second plurality of branches that are connected to the first outlet branch are offset in fluid residence time through the at least two branches,
      wherein the first plurality of branches includes a first branch and a second branch, and wherein the second plurality of branches includes a third branch and a fourth branch, wherein the first branch and the fourth branch are each connected to the first outlet branch, and wherein the second branch and the third branch are each connected to the second outlet branch.

2. The fluid chromatography system of claim 1, wherein the first channel structure is axially or radially symmetric.

3. The fluid chromatography system of claim 1, wherein:
   the first branch includes a greater volume region and a flow restrictor region and the second branch includes a flow restrictor region such that flow rate is the same through each of the first branch and the second branch, and
   the third branch includes a greater volume region and a flow restrictor region and the fourth branch includes a flow restrictor region such that flow rate is the same through each of the third branch and the fourth branch,
   wherein flow time is delayed through the first branch relative to the fourth branch and wherein the flow time is delayed through the second branch relative to the third branch.

4. The fluid chromatography system of claim 1, wherein the continuous flow mixer further comprises:
   a flow dispersion channel structure located downstream from at least one of the first outlet branch and the second outlet branch.

5. The fluid chromatography system of claim 1, wherein the continuous flow mixer further comprises: a second channel structure located between the mixer inlet and the mixer outlet, wherein the first channel structure comprises a first stage and wherein the second channel structure comprises a second stage, the second channel structure including: a first inlet branch; a second inlet branch; a plurality of outlet branches including at least a first outlet branch and a second outlet branch; a first plurality of branches splitting from the first inlet branch, each branch of the first plurality of branches connected to a different of the plurality of outlet branches; and a second plurality of branches splitting from the second inlet branch, each branch of the second plurality of branches connected to a different of the plurality of outlet branches, wherein at least two branches of the first and second plurality of branches that are connected to the first outlet branch are offset in fluid residence time through the at least two branches.

6. The fluid chromatography system of claim 5, wherein the first plurality of branches of the second channel structure includes a first branch and a second branch, and wherein the second plurality of branches of the second channel structure includes a third branch and a fourth branch, and wherein the first branch and the fourth branch of the second channel structure are each connected to the first outlet branch of the second channel structure, and wherein the second branch and the third branch of the second channel structure are each connected to the second outlet branch of the second channel structure.

7. The fluid chromatography system of claim 6, wherein:
   the first branch of the second channel structure includes a greater volume region and a flow restrictor region and the second branch of the second channel structure includes a flow restrictor region such that flow rate is the same through each of the first branch and the second branch of the second channel structure, and the third branch of the second channel structure includes a greater volume region and a flow restrictor region and the fourth branch of the second channel structure includes a flow restrictor region such that flow rate is the same through each of the third branch and the fourth branch of the second channel structure, wherein flow time is delayed through the first branch of the second channel structure relative to the fourth branch and wherein the flow time is delayed through the second branch of the second channel structure relative to the third branch.

8. The fluid chromatography system of claim 7, wherein the greater volume region of the first and third branches of the second channel structure of the second stage has a different volume than the greater volume region of the first and third branches of the first channel structure.

9. A continuous flow mixer for use in a chromatography system comprising:
   a mixer inlet configured to receive an inlet flow of fluid;
   a mixer outlet configured to provide an outlet flow of the fluid; and
   a first channel structure located between the mixer inlet and the mixer outlet, the first channel structure including:
      a first inlet branch;
      a second inlet branch;
      a plurality of outlet branches including at least a first outlet branch and a second outlet branch;
      a first plurality of branches splitting from the first inlet branch, each branch of the first plurality of branches connected to a different of the plurality of outlet branches; and
      a second plurality of branches splitting from the second inlet branch, each branch of the second plurality of branches connected to a different of the plurality of outlet branches,
      wherein at least two branches of the first and second plurality of branches that are connected to the first outlet branch are offset in fluid residence time through the at least two branches,
      wherein the first plurality of branches includes a first branch and a second branch, and wherein the second plurality of branches includes a third branch and a fourth branch, wherein the first branch and the fourth branch are each connected to the first outlet branch, and wherein the second branch and the third branch are each connected to the second outlet branch.

10. The continuous flow mixer of claim 9, wherein the first channel structure is axially or radially symmetric.

11. The continuous flow mixer of claim 9, wherein:
   the first branch includes a greater volume region and a flow restrictor region and the second branch includes a flow restrictor region such that flow rate is the same through each of the first branch and the second branch, and
   the third branch includes a greater volume region and a flow restrictor region and the fourth branch includes a flow restrictor region such that flow rate is the same through each of the third branch and the fourth branch,
   wherein flow time is delayed through the first branch relative to the fourth branch and wherein the flow time is delayed through the second branch relative to the third branch.

12. The continuous flow mixer of claim 9, further comprising:
   a flow dispersion channel structure located downstream from at least one of the first outlet branch and the second outlet branch.

13. The continuous flow mixer of claim 9, further comprising:
   a second channel structure located between the mixer inlet and the mixer outlet, wherein the first channel structure comprises a first stage and wherein the second channel structure comprises a second stage, the second channel structure including:
      a first inlet branch;
      a second inlet branch;
      a plurality of outlet branches including at least a first outlet branch and a second outlet branch;
      a first plurality of branches splitting from the first inlet branch, each branch of the first plurality of branches connected to a different of the plurality of outlet branches; and
      a second plurality of branches splitting from the second inlet branch, each branch of the second plurality of branches connected to a different of the plurality of outlet branches,
      wherein at least two branches of the first and second plurality of branches that are connected to the first outlet branch are offset in fluid residence time through the at least two branches.

14. The continuous flow mixer of claim 13, wherein the first plurality of branches of the second channel structure includes a first branch and a second branch, and wherein the second plurality of branches of the second channel structure includes a third branch and a fourth branch, and wherein the first branch and the fourth branch of the second channel structure are each connected to the first outlet branch of the second channel structure, and wherein the second branch and the third branch of the second channel structure are each connected to the second outlet branch of the second channel structure.

15. The continuous flow mixer of claim 14, wherein:
   the first branch of the second channel structure includes a greater volume region and a flow restrictor region and the second branch of the second channel structure includes a flow restrictor region such that flow rate is the same through each of the first branch and the second branch of the second channel structure, and
   the third branch of the second channel structure includes a greater volume region and a flow restrictor region and the fourth branch of the second channel structure includes a flow restrictor region such that flow rate is the same through each of the third branch and the fourth branch of the second channel structure,
   wherein flow time is delayed through the first branch of the second channel structure relative to the fourth branch and wherein the flow time is delayed through the second branch of the second channel structure relative to the third branch.

16. The continuous flow mixer of claim 15, wherein the greater volume region of the first and third branches of the second channel structure of the second stage has a different volume than the greater volume region of the first and third branches of the first channel structure.

17. A method of mixing fluid in a fluid chromatography system comprising:
   providing a fluid, by at least one fluidic pump, to a mixer;
   receiving the fluid by a mixer inlet of the mixer;
   distributing the received fluid through a channel structure located downstream from the inlet, the channel structure including a first stage that includes a plurality of channel structure inlet branches and a plurality of outlet branches, and a plurality of branches located between the plurality of inlet branches and the plurality of outlet branches such that any given portion of the received fluid flows through only one of the plurality of inlet branches and only one of the plurality of channel structure, wherein at least two branches of the plurality of branches that are connected to the first outlet branch are offset in residence time, wherein the first plurality of branches includes a first branch and a second branch, and wherein the second plurality of branches includes a third branch and a fourth branch, wherein the first branch and the fourth branch are each connected to the first outlet branch, and wherein the second branch and the third branch are each connected to the second outlet branch; and providing an outlet flow of the fluid from the mixer.

18. The method of claim 17, further comprising:

delaying a portion of the received fluid by at least one of the plurality of branches relative to at least one other of the plurality of branches.

* * * * *